(12) United States Patent
Ji et al.

(10) Patent No.: US 9,210,622 B2
(45) Date of Patent: Dec. 8, 2015

(54) METHOD AND APPARATUS FOR RELAY BACKHAUL DESIGN IN A WIRELESS COMMUNICATION SYSTEM

(75) Inventors: Tingfang Ji, San Diego, CA (US); Wanshi Chen, San Diego, CA (US); Dexu Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1454 days.

(21) Appl. No.: 12/853,872

(22) Filed: Aug. 10, 2010

(65) Prior Publication Data

US 2011/0194483 A1    Aug. 11, 2011

Related U.S. Application Data

(60) Provisional application No. 61/233,270, filed on Aug. 12, 2009.

(51) Int. Cl.
| | |
|---|---|
| H04W 88/04 | (2009.01) |
| H04W 16/26 | (2009.01) |
| H04B 7/155 | (2006.01) |
| H04W 36/00 | (2009.01) |
| H04W 36/08 | (2009.01) |
| H04W 72/00 | (2009.01) |

(52) U.S. Cl.
CPC .......... *H04W 36/0033* (2013.01); *H04W 36/08* (2013.01); *H04W 72/00* (2013.01); *H04W 88/04* (2013.01)

(58) Field of Classification Search
CPC ..... H04W 84/12; H04W 80/04; H04W 84/18; H04W 88/06; H04W 74/08
See application file for complete search history.

(56) References Cited

U.S. PATENT DOCUMENTS

| | | | |
|---|---|---|---|
| 7,260,401 B2 * | 8/2007 | Chen et al. | 455/437 |
| 7,339,906 B1 | 3/2008 | Dahlby et al. | |
| 7,567,781 B2 * | 7/2009 | Chen et al. | 455/69 |
| 7,672,383 B2 | 3/2010 | Namgoong et al. | |

(Continued)

FOREIGN PATENT DOCUMENTS

| | | |
|---|---|---|
| CN | 1477887 A | 2/2004 |
| CN | 101218765 A | 7/2008 |

(Continued)

OTHER PUBLICATIONS

Teyebo O., et al ., "Dynamic Relaying in 3GPP LTE-Advanced Networks" EURASIP Journal on Wireless Communications and Networking, HINDAWI Publlishing Corporation, New York, NY, US, Jan. 1, 2009, pp. 1-11, XP002572643.*

(Continued)

*Primary Examiner* — Hassan Phillips
*Assistant Examiner* — Prenell Jones
(74) *Attorney, Agent, or Firm* — Ke Liu

(57) ABSTRACT

Systems and methodologies are described herein that facilitate techniques for design of relay backhaul to support mobility of relay nodes in a wireless communication system. According to various aspects herein, techniques are provided to enable and support the use of mobile relays and to facilitate handover of mobile relays between respective donor cells. More particularly, techniques are provided herein for relay backhaul control channel assignment associated with hand in or hand out of mobile relays, access/backhaul resource partitioning for mobile relays, and management of quality of service (QoS) requirements associated with a relay handover.

35 Claims, 19 Drawing Sheets

(56) References Cited

U.S. PATENT DOCUMENTS

| | | | |
|---|---|---|---|
| 8,059,603 B2* | 11/2011 | Jin | 370/331 |
| 8,126,072 B2 | 2/2012 | Namgoong et al. | |
| 8,228,853 B2 | 7/2012 | Ji et al. | |
| 8,532,056 B2* | 9/2013 | Ulupinar et al. | 370/331 |
| 2002/0090965 A1* | 7/2002 | Chen et al. | 455/522 |
| 2003/0235165 A1 | 12/2003 | Wang | |
| 2004/0203429 A1* | 10/2004 | Anderson et al. | 455/67.11 |
| 2005/0124344 A1* | 6/2005 | Laroia et al. | 455/436 |
| 2006/0003801 A1 | 1/2006 | Hattori | |
| 2006/0084439 A1 | 4/2006 | Joshi et al. | |
| 2007/0153792 A1 | 7/2007 | Mundra et al. | |
| 2007/0249347 A1 | 10/2007 | Saifullah et al. | |
| 2008/0012125 A1 | 1/2008 | Son | |
| 2008/0031197 A1 | 2/2008 | Wang et al. | |
| 2008/0090575 A1 | 4/2008 | Barak et al. | |
| 2008/0125125 A1 | 5/2008 | Choi et al. | |
| 2008/0151784 A1 | 6/2008 | Abrol et al. | |
| 2008/0181183 A1* | 7/2008 | Gale et al. | 370/336 |
| 2008/0186950 A1 | 8/2008 | Zhu et al. | |
| 2008/0232283 A1* | 9/2008 | Jen | 370/310 |
| 2008/0240439 A1 | 10/2008 | Mukherjee et al. | |
| 2009/0088164 A1* | 4/2009 | Shen et al. | 455/436 |
| 2009/0097449 A1* | 4/2009 | Jin | 370/331 |
| 2009/0124261 A1 | 5/2009 | Shimomura | |
| 2009/0175214 A1 | 7/2009 | Sfar et al. | |
| 2009/0197605 A1 | 8/2009 | Kawasaki | |
| 2009/0197624 A1 | 8/2009 | Kwak et al. | |
| 2010/0008282 A1 | 1/2010 | Bhattad et al. | |
| 2010/0022250 A1* | 1/2010 | Petrovic et al. | 455/450 |
| 2010/0029285 A1 | 2/2010 | Horiuchi et al. | |
| 2010/0103858 A1 | 4/2010 | Palanki et al. | |
| 2010/0238845 A1 | 9/2010 | Love et al. | |
| 2010/0238854 A1 | 9/2010 | Kazmi et al. | |
| 2010/0246506 A1* | 9/2010 | Krishnaswamy | 370/329 |
| 2010/0248619 A1* | 9/2010 | Senarath et al. | 455/11.1 |
| 2010/0260096 A1* | 10/2010 | Ulupinar et al. | 370/315 |
| 2010/0260097 A1* | 10/2010 | Ulupinar et al. | 370/315 |
| 2010/0260109 A1* | 10/2010 | Ulupinar et al. | 370/328 |
| 2010/0329216 A1 | 12/2010 | Jen | |
| 2011/0014922 A1 | 1/2011 | Jen | |
| 2011/0034175 A1 | 2/2011 | Fong et al. | |
| 2011/0080864 A1 | 4/2011 | Cai et al. | |
| 2011/0086639 A1* | 4/2011 | Kalervo Hamalainen et al. | 455/436 |
| 2011/0194482 A1 | 8/2011 | Ji et al. | |
| 2011/0222428 A1 | 9/2011 | Charbit et al. | |
| 2012/0002589 A1 | 1/2012 | Saifullah et al. | |
| 2012/0063417 A1* | 3/2012 | Redana et al. | 370/331 |
| 2012/0083199 A1* | 4/2012 | Redana et al. | 455/7 |
| 2012/0087276 A1 | 4/2012 | Huang et al. | |
| 2012/0231797 A1* | 9/2012 | Van Phan et al. | 455/437 |
| 2013/0089055 A1* | 4/2013 | Keevill et al. | 370/329 |
| 2013/0308522 A1* | 11/2013 | Yang et al. | 370/315 |

FOREIGN PATENT DOCUMENTS

| | | | |
|---|---|---|---|
| CN | 101449613 A | | 6/2009 |
| EP | 0615391 A1 | | 9/1994 |
| EP | 1519519 A1 | | 3/2005 |
| EP | 1742428 A1 | | 1/2007 |
| EP | 1748665 A1 | | 1/2007 |
| EP | 1843620 A2 | | 10/2007 |
| EP | 2018074 A1 | | 1/2009 |
| JP | 2009528804 A | | 8/2009 |
| JP | 2009534899 A | | 9/2009 |
| JP | 2011511558 A | | 4/2011 |
| KR | 20080047735 A | | 5/2008 |
| KR | 20080109857 A | | 12/2008 |
| WO | 03088545 A2 | | 10/2003 |
| WO | 2006021236 A1 | | 3/2006 |
| WO | 2006031019 A1 | | 3/2006 |
| WO | 2006073225 A2 | | 7/2006 |
| WO | 2006134480 A2 | | 12/2006 |
| WO | 2007119168 A2 | | 10/2007 |
| WO | 2008002092 A2 | | 1/2008 |
| WO | 2008007437 A1 | | 1/2008 |
| WO | 2008044554 A1 | | 4/2008 |
| WO | 2008060021 A1 | | 5/2008 |
| WO | WO-2008096407 A1 | | 8/2008 |
| WO | WO-2009076208 A2 | | 6/2009 |
| WO | 2009096187 A1 | | 8/2009 |
| WO | 2009097070 A1 | | 8/2009 |

OTHER PUBLICATIONS

Tzeyeb O., et al., "Handover Framework for Relay Enhanced LTE Networks" Communications Workshops, 2009, ICC Workshops 2009. IEEE International Conference on, IEEE, Piscataway, NJ, USA, Jun. 14, 2009, pp. 1-5, XP031515443.*

CMCC: "Discussion on system information reading for relay node", R2-093265, 3GPP, May 4-8, 2009.

International Search Report and Written Opinion—PCT/US2010/045396, International Search Authority—European Patent Office—Mar. 24, 2011.

Nokia, Nokia Siemens Networks: "Text proposal for 36.814 on Access-Backhaul partitioning of Relays", 3GPP TSG RAN WG1 Meeting #56bis R1-091361, 3GPP, Mar. 27, 2009.

ZTE: "Consideration on UL Backhaul Resource Configuration and Indication", R1-092469, 3GPP, Jun. 29-Jul. 3, 2009.

ZTE: "Control Channel of Backhaul Link", 3GPP Draft; R1-092468_Controlchannelbackhaul, 3rd Generation Partnership Project (3GPP), Mobile Competence Centre ; 650, Route Des Lucioles ; F-06921 Sophia-Antipolis Cedex ; France, No. Los Angeles, USA; Jun. 23, 2009, XP050350977, [retrieved on Jun. 23, 2009].

Huawei: "Additional consideration for Type 1 Relay" 3GPP Draft; R3-091335, 3rd Generation Partnership Project (3GPP), Mobile Competence Centre; 650m Route Des Lucioles; F-06921 Sophia-Antipolis Cedex; France, San Francisco, USA; Apr. 29, 2009, XP050341671.

LG ElectronicsInc., Discussionon alternatives on Relay [online] 3GPPTSG-RAN WG2# 66bis R2-093879, <URL:http://www.3gpp.org/ftp/tsg_ran/WG2_RL2/TSGR2_66bis/Docs/R2-093879.zip> Jul. 8, 2009.

LG Electronics: "Resource Allocation and Downlink Control Channel Structure for Relay Backhaul Link" 3GPP Draft; R1-092115 LGE_Backhaul Resource Allocation, 3rd Generation Partnership Project (3GPP), Mobile Competence Centre; 650, Route Des Lucioles; F-06921 Sophia-Antipolis Cedex; France, No. San Francisco, USA; Apr. 28, 2009, XP050339560 [retrieved on Apr. 29, 2009] p. 2, figure 1.

NEC Group, "MBSFN Subframe and Control Structure for Relay Type 1 nodes", 3GPP TSG-RAN WG1#57, R1-091689, pp. 1-5, May 4-8, 2009.

Samsung: "Discussion on Backhaul Control Design for Type-I L3 Relay," 3GPP TSG RAN WG1 Meeting #57, R1-091871, San Francisco, USA, May 4-8, 2009, pp. 5.

Taiwan Search Report—TW099126978—TIPO—Feb. 12, 2014.

Vodafone, "Relay backhauling via MBSFN Sub Frame for TDD LTE system", 3GPP TSG-RAN WG1, R1-091404, pp. 1-5, Mar. 23-27, 2009.

* cited by examiner

METHOD AND APPARATUS FOR RELAY BACKHAUL DESIGN IN A WIRELESS COMMUNICATION SYSTEM

CROSS-REFERENCE

This application claims the benefit of U.S. Provisional Application Ser. No. 61/233,270, filed Aug. 12, 2009, and entitled "SYSTEMS AND METHODS OF RELAY BASE STATION BACK HAUL." Additionally, this application is related to co-pending U.S. patent application Ser. No. 12/853,835, filed Aug. 10, 2010, and entitled "METHOD AND APPARATUS FOR RELAY BACKHAUL DESIGN IN A WIRELESS COMMUNICATION SYSTEM." The above applications are incorporated herein by reference in their entirety.

BACKGROUND

I. Field

The present disclosure relates generally to wireless communications, and more specifically to techniques for managing mobility of relay nodes in a wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

In various wireless communication systems, relay nodes and/or other suitable network nodes can be utilized to enhance communication between an Evolved Node B (eNB) and respective user equipment units (UEs) served by the eNB. For example, in the case of Hybrid Automatic Repeat Request (HARM) transmission and/or another suitable repeat transmission scheme, a relay node can detect communication between an eNB and UE and assist on re-transmissions to the UE as required.

Moreover, in some network implementations, relay nodes can be configured to be mobile, where a mobile relay node can pass between respective eNBs to provide substantially continuous communication service for respective UEs associated with the relay node. However, if a relay node experiences problems during a handoff procedure from a source eNB to a target eNB, service degradation to the associated UEs, up to and including full service interruption, can occur. Accordingly, it would be desirable to implement techniques for managing mobility of a relay node throughout a wireless communication system with minimal impact on associated users.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise obtaining information relating to an access/backhaul resource partitioning corresponding to an associated relay node; detecting requested handover of the associated relay node to a target cell; and indicating the access/backhaul resource partitioning to the target cell in connection with the requested handover to enable partitioning of access resources and backhaul resources at the target cell based on the access/backhaul resource partitioning.

A second aspect described herein relates to a wireless communications apparatus, which can comprise a memory that stores data relating to a relay node and an access/backhaul resource partitioning corresponding to the relay node. The wireless communications apparatus can further comprise a processor configured to detect requested handover of the relay node to a target cell and to indicate the access/backhaul resource partitioning to the target cell in connection with the requested handover.

A third aspect relates to an apparatus, which can comprise means for identifying access resources and backhaul resources corresponding to a relay node and means for indicating identities of the access resources and the backhaul resources to a target cell corresponding to a requested handover of the relay node.

A fourth aspect described herein relates to a computer program product, which can include a computer-readable medium that comprises code for causing a computer to identify access resources and backhaul resources corresponding to a relay node and code for causing a computer to indicate identities of the access resources and the backhaul resources to a target cell corresponding to a requested handover of the relay node.

A fifth aspect herein relates to a method operable in a wireless communication system. The method can comprise detecting requested handover of a relay node from a source cell; receiving information from the source cell in connection with the requested handover relating to an access/backhaul resource partitioning utilized by the source cell for the relay node; and configuring an allocation of access subframes and backhaul subframes corresponding to the relay node based at least in part on the information received from the source cell.

A sixth aspect described herein relates to a wireless communications apparatus, which can comprise a memory that stores data relating to a relay node, a source cell, and a requested handover of the relay node from the source cell. The wireless communications apparatus can further comprise a processor configured to receive information from the source cell in connection with the requested handover relating to an access/backhaul resource partitioning utilized by the source cell for the relay node and to determine an allocation of access subframes and backhaul subframes corresponding to the relay node based at least in part on the information received from the source cell.

A seventh aspect relates to an apparatus, which can comprise means for receiving information from a source eNB in response to a requested handover of a relay node from the source eNB relating to a partitioning of access resources and backhaul resources utilized by the source eNB for the relay node and means for allocating access resources and backhaul resources for the relay node based at least in part on the information received from the source eNB.

An eighth aspect described herein relates to a computer program product, which can include a computer-readable medium that comprises code for causing a computer to receive information from a source eNB in response to a requested handover of a relay node from the source eNB relating to a partitioning of access resources and backhaul resources utilized by the source eNB for the relay node and code for causing a computer to allocate access resources and backhaul resources for the relay node based at least in part on the information received from the source eNB.

According to a ninth aspect, a method is described herein. The method can comprise identifying an allocation of access subframes and backhaul subframes associated with relay communication; initializing a handover from a source eNB to a destination eNB; obtaining information relating to an access/backhaul subframe allocation utilized by the destination eNB; and adjusting one or more subframes in the allocation of access subframes and backhaul subframes based on the access/backhaul subframe allocation utilized by the destination eNB.

A tenth aspect described herein relates to a wireless communications apparatus, which can comprise a memory that stores data relating to a source eNB and a destination eNB. The wireless communications apparatus can further comprise a processor configured to identify an allocation of access subframes and backhaul subframes associated with relay communication, to initialize a handover from the source eNB to the destination eNB, to obtain information relating to an access/backhaul subframe allocation utilized by the destination eNB, and to adjust one or more subframes in the allocation of access subframes and backhaul subframes based on the access/backhaul subframe allocation utilized by the destination eNB.

An eleventh aspect relates to an apparatus, which can comprise means for identifying an allocation of access resources and backhaul resources associated with relay communication; means for initializing a relay handover to a target cell; and means for adjusting at least a portion of the allocation of access resources and backhaul resources based on an access/backhaul resource partitioning associated with the target cell.

A twelfth aspect described herein relates to a computer program product, which can include a computer-readable medium that comprises code for causing a computer to identify an allocation of access resources and backhaul resources associated with relay communication; code for causing a computer to initialize a relay handover to a target cell; and code for causing a computer to adjust at least a portion of the allocation of access resources and backhaul resources based on an access/backhaul resource partitioning associated with the target cell.

A thirteenth aspect herein relates to a method operable in a wireless communication system. The method can comprise detecting a requested initialization of communication service for a relay node in association with a handover of the relay node; identifying a quality of service (QoS) requirement for the handover of the relay node; and directing communication in connection with the handover of the relay node such that the QoS requirement for the handover of the relay node is substantially preserved.

A fourteenth aspect described herein relates to a wireless communications apparatus, which can comprise a memory that stores data relating to a relay node. The wireless communications apparatus can further comprise a processor configured to detect requested initialization of communication service for the relay node in association with a handover of the relay node, to identify a QoS requirement for the handover of the relay node, and to direct communication in connection with the handover of the relay node such that the QoS requirement for the handover of the relay node is substantially preserved.

A fifteenth aspect relates to an apparatus, which can comprise means for detecting initialization of a handover of a relay node and a QoS requirement associated with the handover of the relay node and means for managing communication relating to the handover of the relay node such that the QoS requirement associated with the handover of the relay node is substantially met.

A sixteenth aspect described herein relates to a computer program product, which can include a computer-readable medium that comprises code for causing a computer to detect initialization of a handover of a relay node and a QoS requirement associated with the handover of the relay node and code for causing a computer to manage communication relating to the handover of the relay node such that the QoS requirement associated with the handover of the relay node is substantially met.

According to a seventeenth aspect, a method is described herein. The method can comprise initializing a relay handover to a target donor eNB; identifying a QoS requirement for the relay handover; and directing communication in connection with the relay handover such that the QoS requirement for the relay handover is substantially preserved.

An eighteenth aspect described herein relates to a wireless communications apparatus, which can comprise a memory that stores data relating to a target donor eNB. The wireless communications apparatus can further comprise a processor configured to initialize a relay handover to the target donor eNB, to identify a QoS requirement for the relay handover, and to direct communication in connection with the relay handover such that the QoS requirement for the relay handover is substantially preserved.

A nineteenth aspect relates to an apparatus, which can comprise means for identifying a target cell for a relay handover and a QoS requirement associated with the relay handover and means for managing communication relating to the relay handover such that the QoS requirement associated with the relay handover is substantially met.

A twentieth aspect described herein relates to a computer program product, which can include a computer-readable medium that comprises code for causing a computer to identify a target cell for a relay handover and a QoS requirement associated with the relay handover and code for causing a computer to manage communication relating to the relay handover such that the QoS requirement associated with the relay handover is substantially met.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
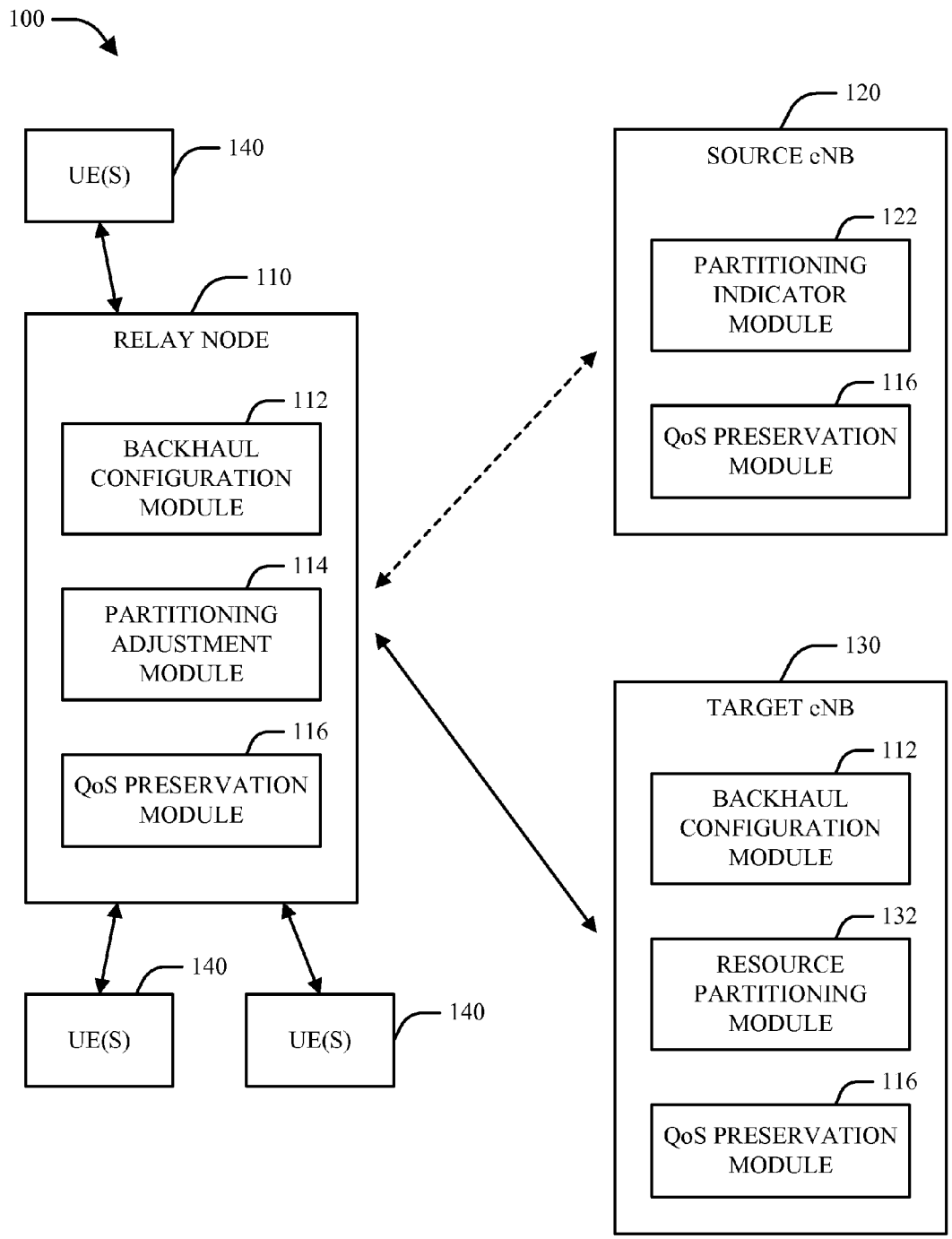
FIG. 1 is a block diagram of a system that facilitates operation of mobile relay nodes within a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or omit some or all of the devices, components, modules etc. discussed in connection with the figures. A combination of these approaches can also be used.

Referring now to the drawings, FIG. 1 illustrates a system 100 that facilitates operation of mobile relay nodes within a wireless communication system in accordance with various aspects described herein. As FIG. 1 illustrates, system 100 can include one or more network nodes (also referred to herein as Node Bs or eNBs, cells or network cells, base stations, access points (APs), etc.). Network nodes in system 100 can include, for example, one or more network nodes that provide communication service to one or more UEs 140 either indirectly or directly (not shown), referred to herein as donor eNBs (DeNBs). For example, as shown in system 100, DeNBs can include a source eNB 120 and a target eNB 130, as described in further detail below. Additionally, network nodes in system 100 can include one or more relay nodes (RNs) 110, which can assist in facilitating communication between respective DeNBs and one or more UEs 140. As used herein, a UE can also be referred to as an access terminal (AT), mobile terminal, user or mobile station, etc.

In accordance with one aspect, UE 140 can engage in one or more uplink (UL, also referred to herein as reverse link (RL)) communications with source eNB 120, target eNB 130, and/or RN 110, and similarly nodes 110-130 can engage in one or more downlink (DL, also referred to herein as forward link (FL)) communications to UE(s) 140. In turn, RN 110 can engage in one or more access communications with UE(s) 140 and/or backhaul communications with source eNB 120 and/or target eNB 130. As used herein, "uplink access" refers to communications from UE(s) 140 to RN 110, and "downlink access" refers to communications from RN 110 to UE(s) 140. Similarly, "uplink backhaul" refers to communications from RN 110 to source eNB 120 and/or target eNB 130, and "downlink backhaul" refers to communications from source eNB 120 and/or target eNB 130 to RN 110. Additionally or alternatively, RN 110, eNBs 120 and/or 130, and/or UE(s) 140 can engage in any suitable communication(s) with each other, with other devices or entities in system 100, and/or any other suitable entities.

In one example, backhaul communication between RN 110 and eNBs 120 and/or 130 can be conducted in any suitable manner. For example, a backhaul link from RN 110 to eNBs 120 and/or 130 can be a direct link, an indirect link (e.g., via a central network entity, not shown), and/or any other suitable link(s). Further, communication links between RN 110 and some eNBs 120 and/or 130, as well as communication links between RN 110 and some UEs 140, can be implemented using any suitable wired or wireless communication technology or combination of technologies. To this end, RN 110, eNBs 120 and/or 130, and/or UE(s) 140 can utilize respective transceivers, network ports or interfaces, and/or any other suitable means for communication within system 100.

In accordance with one aspect, RN 110 can include some or all of the functionality of an eNB in system 100, such as source eNB 120, target eNB 130, or the like. Alternatively, RN 110 can be a specialized network node dedicated to assisting in communication between a DeNB and related UEs 140. For example, RN 110 can operate to relay information from a DeNB to one or more UEs 140 in a transparent manner to said UEs 140. Thus, in one example, RN 110 can communicate to a UE 140 without providing physical signals to the UE 140 that identify RN 110. Alternatively, RN 110 can operate in a fully or partially non-transparent manner to UEs 140. For example, RN 110 can make its presence known to a UE 140 in order to facilitate channel quality reporting at the UE 140 corresponding to a channel between the UE 140 and RN 110.

In accordance with another aspect, RN 110 can be implemented as a stationary relay or a mobile relay. In one example, a stationary relay can be fixed at a given geographic location and configured to associate with one or more eNBs within range of its location. Respective eNBs to which a stationary relay associates can be predefined or otherwise constant, or alternatively a stationary relay can associate with varying eNBs over time based on various criteria. Alternatively, a mobile relay can be capable of movement between geographic areas. A mobile relay can be utilized, for example, in the case of a mass transit vehicle (e.g., a passenger train, bus, airplane, etc.) to provide continuous communication coverage for the passengers aboard the vehicle as the vehicle moves through respective network cells. As a mobile relay moves from the coverage of one eNB to the coverage of another eNB, the relay can perform a handover operation to associate with the new eNB. For example, as shown in system 100, RN 110 can perform a handover operation to discontinue association with source eNB 120 and to establish association with target eNB 130. As used herein, a handover operation conducted by a mobile RN 110 is referred to as a "relay handover."

As a mobile RN 110, depending on implementation, can be capable of relatively rapid movement between coverage areas, a mobile RN 110 in some cases can require substantially frequent relay handovers. However, it can be appreciated that relay handovers performed at a relatively high frequency can affect respective UEs 140 that interact with the corresponding RN 110. For example, in the case of a UE 140 that does not move with RN 110, the UE 140 can detect and associate with RN 110 upon RN 110 coming into range of UE 140. However, as RN 110 subsequently moves out of range of UE 140, UE 140 is required to hand over back to a serving base station. In another example, in the case of a UE 140 that does move with RN 110, the UE 140 can associate with RN 110 and communicate with respective eNBs through RN 110 in such a way that is made substantially transparent to the UE 140. To accomplish this, respective communication channels between RN 110 and a target eNB 130 must be established when RN 110 moves from the coverage of a source eNB 120 to the coverage of the target eNB 130. However, if establishment of the communication channels fails or is significantly delayed (e.g., due to communication failure, failure of the target eNB 130 to act within a sufficient amount of time, etc.), the connection between RN 110 and the network corresponding to eNBs 120 and 130 can be lost, resulting in a degradation or loss of communication service to the UEs 140 associated with RN 110.

Accordingly, to mitigate reduced user experience associated with handover of RN 110 from source eNB 120 to target eNB 130, various entities in system 100 can implement one or more measures as shown by FIG. 1 to facilitate enhanced support of mobility for RN 110. In a first example, RN 110 and/or target eNB 130 can utilize a backhaul configuration module 112 to facilitate semi-static assignment of control channel resources at target eNB 130 based on hand in or hand out of mobile relays. In a second example, RN 110 and eNBs 120-130 can implement radio resource control (RRC) configuration of RN 110 by various means. For example, a partitioning adjustment module 114 at RN 110, a partitioning indicator module 122 at source eNB 120, and/or a resource partitioning module 132 at target eNB 130 can be utilized to configure an access/backhaul resource partitioning arrangement utilized for communication between eNBs 120-130 and RN 110. In a third example, RN 110 and/or eNBs 120-130 can utilize a QoS preservation module 116 and/or other suitable means to ensure maintenance of QoS requirements during a relay handover. Various examples of techniques that can be utilized by RN 110 and eNBs 120-130, as well as the modules utilized by such entities as illustrated by FIG. 1, are described in further detail herein.

In accordance with one aspect, a predetermined or configurable amount of resources can be semi-statically reserved and/or allocated for backhaul communication between RN 110 and eNB 120 and/or 130. For example, a Relay Physical Downlink Control Channel (R-PDCCH) can be assigned for communication from an eNB 120 or 130 to RN 110. In one example, resources for R-PDCCH can be reserved or allocated in a time-division multiplexed (TDM) and/or frequency-division multiplexed (FDM) manner. In the event that RN 110 is a mobile relay, an eNB 120 and/or 130 can potentially serve multiple RNs 110 due to movement of respective RNs 110 into and out of coverage of the eNB 120 and/or 130. Accordingly, in such a case the reservation and/or allocation of relay control resources at a donor cell corresponding to an eNB 120 and/or 130 can be adjusted based on the number of RNs 110 served by the cell.

In one example, upon establishment of a connection between RN 110 and a target eNB 130 (e.g., through a handover, activation of RN 110, etc.) and/or other system changes, resources for R-PDCCH and other suitable channels can be allocated for communication between RN 110 and target UE 130. However, it can be appreciated that if R-PDCCH allocation and/or other control allocation experiences a significant amount of latency, one or more UEs 140 associated with RN 110 can experience partial to complete outage. For example, if RN 110 fails to be served upon a handover and drops connection with target eNB 130, then all UEs 140 associated with RN 110 and/or target eNB 130 can consequentially have their connections dropped. Accordingly, it can be appreciated that it would be desirable to establish resources for communication between RN 110 and target eNB 130 as fast as possible.

In general, it can be appreciated that broadcast control channel setup, such as that which is performed for handover of a UE, is a substantially slow process. For instance, in many cases a UE is required to wait according to an associated periodicity before a channel is set up. Further, channel setup can require paging of other served users relating to a change in system configuration caused by the channel setup. For example, if two resource blocks (RBs) are utilized in a FDM fashion in a given cell for one or more control channels, informing users of a change to these channels requires paging of substantially all users, which is generally a slow process (e.g., on the order of seconds).

Figure 2:
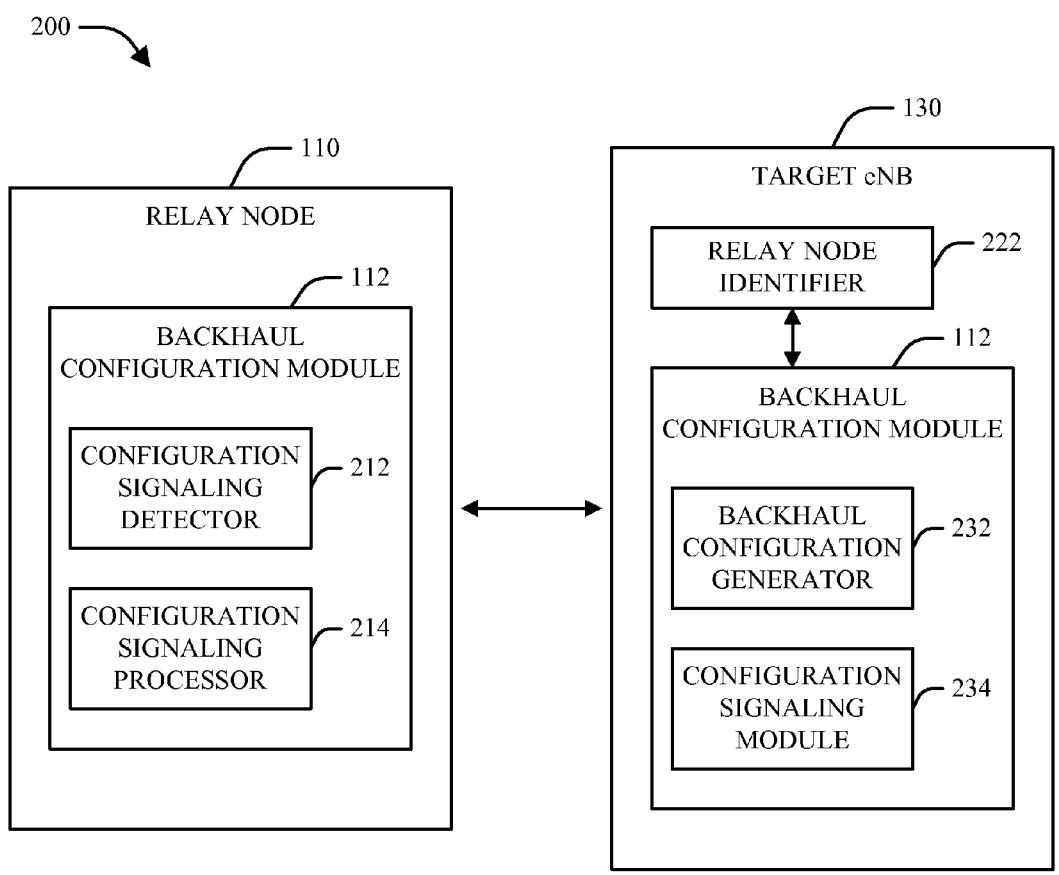
FIGS. 2-3 are block diagrams of respective systems for resource assignment for a relay node in connection with a relay handover in accordance with various aspects.

Thus, according to one aspect, as broadcast-based control channel reconfiguration is a slow process as noted above, unicast control channel setup can be utilized at substantially the same time as connection setup. This is illustrated in further detail by system 200 in FIG. 2. As system 200 illustrates, a RN 110 and/or other entities in system 200 can initialize a handover from a source donor cell (e.g., source eNB 120, not shown in FIG. 2) to a target donor cell (e.g., target eNB 130). In response to initialization of the handover, a backhaul configuration module 112 and/or other means associated with RN 110 can utilize a configuration signaling detector 212 and/or other means to receive relay configuration messaging from target eNB 130. Further, RN 110 can utilize a configuration signaling processor 214 or other suitable mechanisms to establish connection with target eNB 130 at least in part by configuring one or more relay backhaul control channels (e.g., R-PDCCH, etc.) based on the relay configuration messaging. In one example, based at least in part on received relay configuration messaging, configuration signaling processor 214 and/or other suitable mechanisms associated with RN 110 can be utilized to determine an amount of resources to allocate for the one or more relay backhaul control channels as a function of a number of associated users.

Correspondingly, target eNB 130 can be configured to detect a requested initialization of communication service for RN 110 or another suitable network apparatus in association with a handover of RN 110. Target eNB 130 can further include a relay node identifier 222 that can be operable to identify RN 110 as a relay node. In response to identifying RN 110 as a relay node, target eNB 130 can further utilize a backhaul configuration generator 232 to configure one or more relay control channels (e.g., R-PDCCH, etc.) for use by RN 110 and a configuration signaling module 234 to establish communication with RN 110 over the one or more relay backhaul control channels at least in part by communicating relay configuration messaging to RN 110.

In the case of broadcast-based R-PDCCH or other control channel configuration, it can be appreciated that control information can be carried in the master information block (MIB) or system information blocks (SIBs). Alternatively, due to the relatively slow speed of broadcast-based control configuration as noted above, unicast control reconfiguration can be performed within system 200 at substantially the same time as connection setup. Thus, in addition to carrying control channel information in the MIB and/or SIBs, control channel information can additionally be signaled by configuration signaling module 234 and/or other suitable mechanisms in system 200 via unicast signaling, such as unicast layer 3 (L3) messaging or the like.

In another example, configuration signaling module 234 can communicate dynamic layer 1 (L1) signaling to RN 110, e.g., in a similar manner to a Physical Control Format Indicator Channel (PCFICH). This can be done, for example, in the case of TDM control, FDM control, and/or any other suitable control type(s). In accordance with one aspect, L1 signaling, L3 signaling, and/or other suitable signaling provided by target eNB 130 can be utilized to direct an amount of resources to be associated with one or more relay backhaul control channels. In one example, the amount of resources to be associated with the one or more relay backhaul control channels can be determined as a function of a number of relay nodes served by target eNB 130. In another example, a set of possible control channel resources (e.g., based on interleaving level, localized vs. distributed, etc.) can be pre-defined such that an index of each possibility can be broadcasted. Thus, for example, target eNB 130 can identify at least one candidate resource allocation and indices respectively associated with the at least one candidate resource allocation, select a candidate resource allocation to be utilized by RN 110 for the one or more relay backhaul control channels and an index corresponding to the candidate resource allocation to be utilized by RN 110 in order to obtain a selected index, and communicate the selected index to RN 110 within relay configuration messaging.

By way of example, an indication can be provided by target eNB 130 within a given subframe that informs one or more users that a given number of subframes is allocated for control. As described above, similar techniques can be utilized for relay control channels. For example, as PDCCH size can be controlled by PCFICH, R-PDCCH size can be indicated by PCFICH. However, in the event that the initial control signals in a control transmission are not capable of being received by a relay node, relay control channel configuration can be achieved by using a fixed allocation of RBs (e.g., 1 RB) that indicates how many additional RBs are utilized for relay control. In one example, the amount of additional relay control RBs can vary from subframe to subframe. Thus, for example, in the event that the amount of resources to be associated with one or more relay backhaul control channels by RN 110 corresponds to one or more RBs, target eNB 130 can embed, on a predefined backhaul RB in the relay configuration messaging, a number of additional RBs to be associated with the one or more relay backhaul control channels.

According to another aspect, at RN 110, configuration signaling processor 214 and/or other suitable means can be utilized to configure a resource allocation for one or more relay backhaul control channels based on relay configuration messaging as generated and transmitted as described above. For example, if the relay configuration messaging includes index information, RN 110 can obtain information relating to a set of candidate resource allocations for one or more relay backhaul control channels and indices respectively associated with candidate resource allocations in the set. RN 110 can then identify an index provided within the index information and configure a resource allocation for the one or more relay backhaul control channels according to a candidate resource allocation that corresponds to the index provided within the index information. Further, if the resource allocation for one or more relay backhaul control channels corresponds to an amount of RBs, RN 110 can be configured to receive relay configuration messaging on a designated RB, identify an indicated number of additional RBs within the relay configuration messaging, and allocate the indicated number of additional RBs for use by the one or more relay backhaul control channels.

According to a further aspect, information corresponding to an allocation of resources for R-PDCCH and/or other relay backhaul control channels can be updated subsequent to initialization of a connection between RN 110 and target eNB 130. For example, target eNB 130 can be configured to identify an updated resource allocation to be utilized by RN 110 for one or more relay backhaul control channels and to communicate updated relay configuration messaging to RN 110 that indicates the updated resource allocation. RN 110 can subsequently receive the updated relay configuration messaging from target eNB 130 and update configuration of the one or more relay backhaul control channels based on the updated relay configuration messaging.

Figure 3:
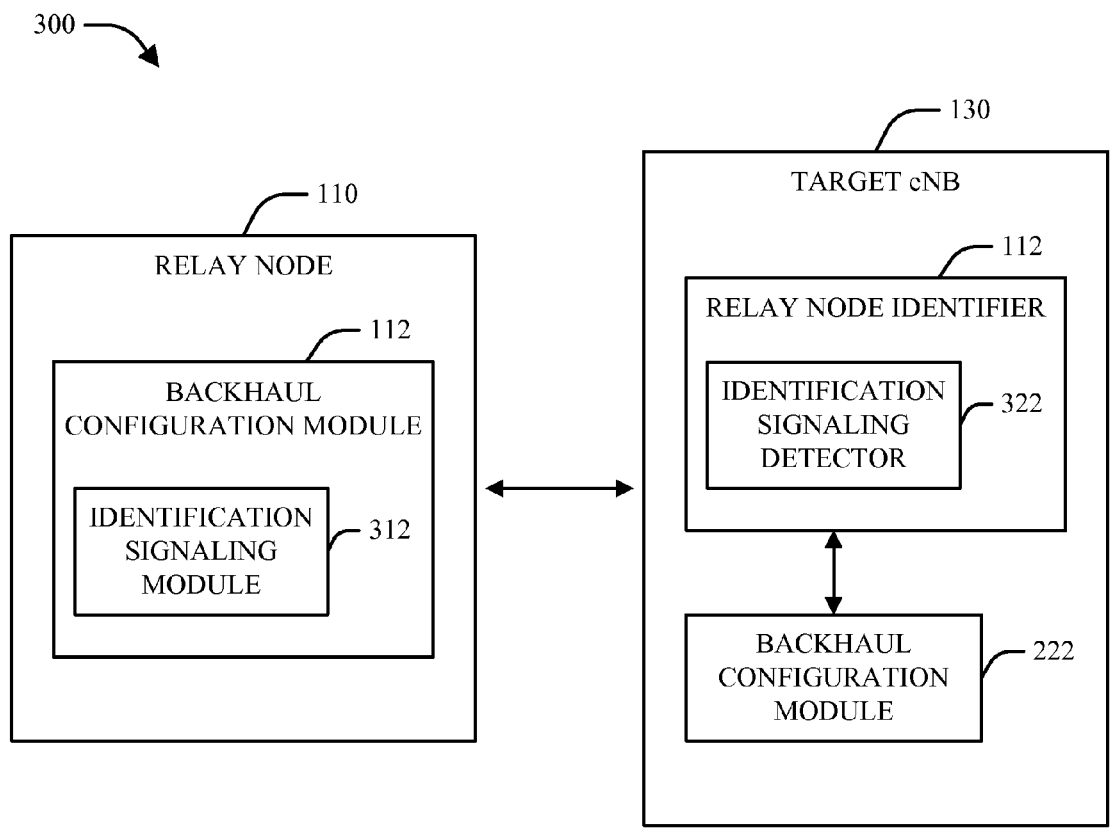

In accordance with an additional aspect, if there are no relay resources in a target cell (e.g., corresponding to a target eNB 130), a mobile RN 110 can bootstrap from a typical UE setup procedure to establish a connection with target eNB 130 and subsequently set up R-PDCCH and/or other suitable control channels. For example, as shown by system 300 in FIG. 3, handover of RN 110 can be initially conducted as if RN 110 is a UE. Subsequently during the handover process, an identification signaling module 312 and/or other suitable means associated with RN 110 can indicate to target eNB 130 that RN 110 is a relay node. Based on this indication, an identification signaling detector 322 and/or other suitable means at target eNB 130 can identify RN 110 as a relay node, such that setup of relay control channels can be initialized.

Thus, in one example, RN 110 can initialize a mobile device handover, wherein RN 110 can establish identity as a relay node with target eNB 130 and receive relay configuration messaging from target eNB 130 in response to establishing identity as a relay node with target eNB 130. Correspondingly, target eNB 130 can initialize a mobile device handover for RN 110 in response to requested initialization of communication service for RN 110. Subsequently, target eNB 130 can identify RN 110 as a relay node based at least in part on signaling received from RN 110 in connection with the mobile device handover.

While various examples and aspects described above relate to the specific case of R-PDCCH setup, it should be appreciated that other control channels can be configured via similar techniques. For example, a Physical Random Access Channel (PRACH) can be configured for backhaul communication between RN 110 and target eNB 130 using similar techniques as those described above. In addition, it should be appreciated that any other suitable control channel(s) can be configured using the techniques described above. Moreover, unless explicitly stated otherwise, the claimed subject matter is not intended to be limited to any specific control channel(s).

According to another aspect, when a mobile relay hands over from one eNB to another, the access/backhaul partitioning of the relay may in some cases require modification. For example, it can be appreciated that relay backhaul and access can be partitioned in time, such that some subframes are allocated for eNB to relay (backhaul) communication and other subframes are allocated for relay to UE (access) communication. In the case that each relay can have a different access to backhaul configuration, when a relay moves from one eNB to another eNB, the new eNB can potentially have a different access to backhaul configuration as the previous eNB. Further, UEs associated with a relay node can be configured to expect to communicate with the relay node on access subframes in a given cell. However, upon movement to a new cell, the partitioning of access and backhaul subframes can change. As such a change is not immediately relayed to UEs associated with the relay node, it would be desirable to implement various techniques for synchronizing all entities involved in communication with the relay node with respect to access/backhaul resource partitioning.

Figure 4:
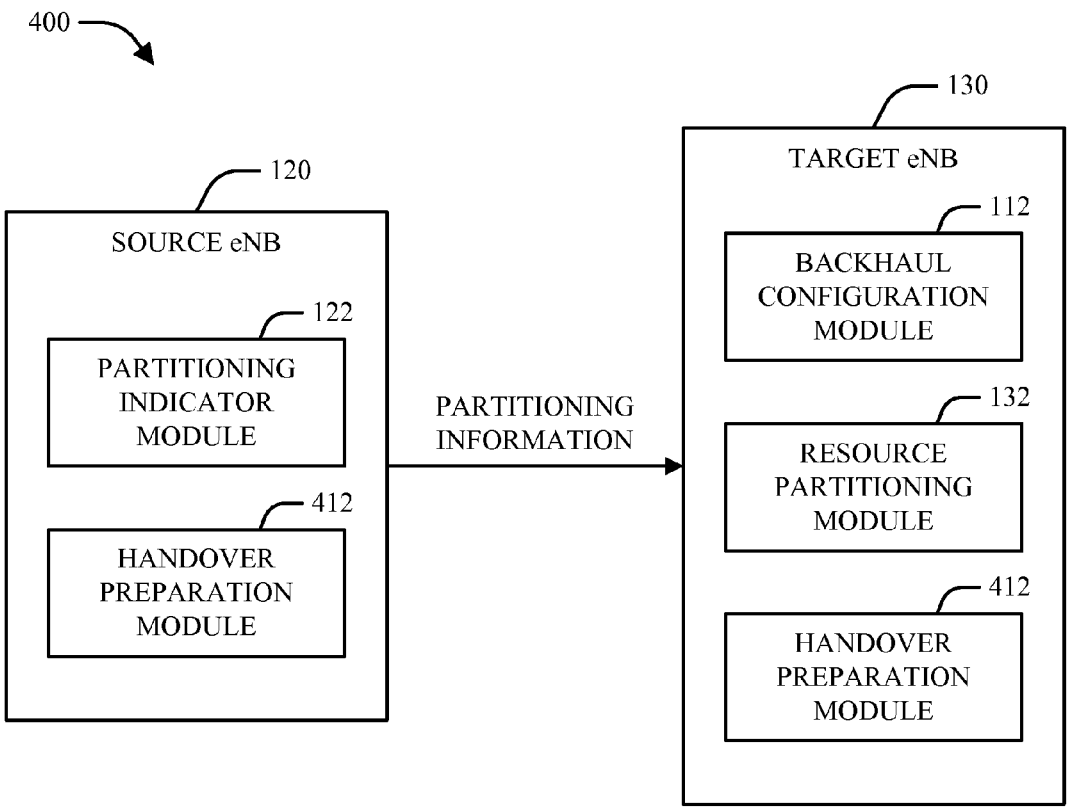
FIG. 4 is a block diagram of a system for configuring a resource partitioning utilized by a relay node in connection with a relay handover in accordance with various aspects.

Thus, to facilitate a relay handover without substantial service interruption to relay UEs, various techniques are provided herein. In a first example illustrated by system 400 in FIG. 4, a source eNB 120 relating to a relay handover can inform the target eNB 130 or destination eNB relating to the relay handover of the partitioning information of the relay node (not shown in FIG. 4). For example, as illustrated by system 400, a source eNB 120 can obtain information relating to an access/backhaul resource partitioning corresponding to an associated relay node, after which source eNB 120 can utilize a handover preparation module 412 and/or other suitable mechanisms to direct requested handover of the associated relay node to target eNB 130. Further, in connection with the requested handover, a partitioning indicator module 122 and/or other suitable means can be used by source eNB 120 to indicate the access/backhaul resource partitioning to target eNB 130. In one example, the access/backhaul partitioning can be indicated to target eNB 130 by partitioning indicator module 122 prior to the requested handover. Further, by indicating the access/backhaul partitioning to target eNB 130, it can be appreciated that source eNB 120 can direct a partitioning of access subframes and backhaul subframes, and/or other access/backhaul resource partitioning, as established by target eNB 130 for an associated relay node.

Further, at target eNB 130, upon detecting requested handover of a relay node from source eNB 120 via a handover preparation module 412 and/or other suitable means, target eNB 130 can utilize a backhaul configuration module 112 or other mechanisms to receive information from source eNB 120 in connection with the requested handover relating to an access/backhaul resource partitioning utilized by source eNB 120 for the relay node. Based on the information received from source eNB 120, a resource partitioning module 132 at target eNB 130 can configure an allocation of access subframes and backhaul subframes corresponding to the relay node. In one example, information relating to the access/backhaul resource partitioning for the relay node can be received from source eNB 120 prior to the requested handover.

In accordance with one aspect, resource partitioning module 132 at target eNB 130 can utilize information received from source eNB 120 in order to configure an allocation of access subframes and backhaul subframes corresponding to a relay node that substantially preserves the access/backhaul resource partitioning utilized by source eNB 120 for the relay node. In turn, target eNB 130 can inform the relay node of the resource partitioning if necessary to facilitate substantially seamless operation through the handover.

In one example, an assigned Random Access Channel (RACH) occasion by target eNB 130 can be a current UL backhaul subframe for the relay. By configuring an allocation of access subframes and backhaul subframes corresponding to a relay node such that an assigned RACH occasion associated with the relay node occurs on an UL backhaul subframe corresponding to the relay node, a relay node can be prevented from being required to transmit on its access subframes, which in some cases may be substantially impracticable or impossible due to relay node capabilities.

In another example, an allocation of access subframes and backhaul subframes corresponding to a relay node can be configured by target eNB 130 such that a Random Access Response (RAR) transmitted by target eNB 130 to the relay node occurs on a DL backhaul subframe for the relay node. This can be done, for example, to enable reception of the RAR at the relay node according to the configured backhaul resources of the relay node.

Figure 5:
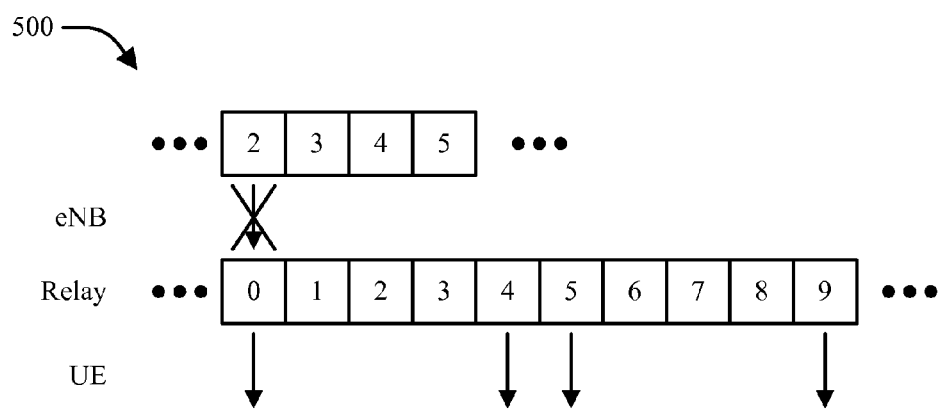
FIG. 5 illustrates an example subframe configuration that can be utilized by various devices in a wireless communication system.

In a third example, resource partitioning module 132 can be operable to configure an allocation of access subframes and backhaul subframes corresponding to a relay node such that respective non-removable access subframes corresponding to the relay node are allocated as access subframes. As used herein, non-removable access subframes are defined as subframes that cannot be utilized by a relay node as backhaul due to various constraints. By way of specific, non-limiting example, in a ten-subframe radio frame, non-removable access subframes can include subframes 0, 4, 5, and 9 for FDD and 0, 1, 5, and 6 for TDD. An example of non-removable access subframes for FDD is illustrated by diagram 500 in FIG. 5. In one example, non-removable access subframes can present due to Multimedia Broadcast over Single-Frequency Network (MBSFN) constraints and/or other constraints. For example, in the event that a relay node configures backhaul subframes as MBSFN subframes, non-removable access subframes can be defined as the subframes which cannot be configured as MBSFN subframes by the relay node.

In another example, as further illustrated by diagram 500, non-MBSFN subframes can be identified from the perspective of a relay node as opposed to a donor eNB. Thus, if an offset exists between the subframes of an eNB and the subframes of an associated relay node, the eNB can be configured to identify non-MBSFN subframes based on the configuration of the relay node. For example, as shown in diagram 500, in the event of a two-subframe offset exists between an eNB and a relay node, the eNB can identify non-MBSFN subframes according to a beginning subframe index of 2 instead of 0. Accordingly, referring back to system 400, resource partitioning module 132 and/or other means associated with target eNB 130 can be operable to identify a subframe offset corresponding to a relay node, to obtain information relating to one or more predetermined non-MBSFN subframe positions within a given radio frame, and to determine the non-MBSFN subframe positions within the given radio frame with respect to the relay node based on the subframe offset corresponding to the relay node.

Figure 6:
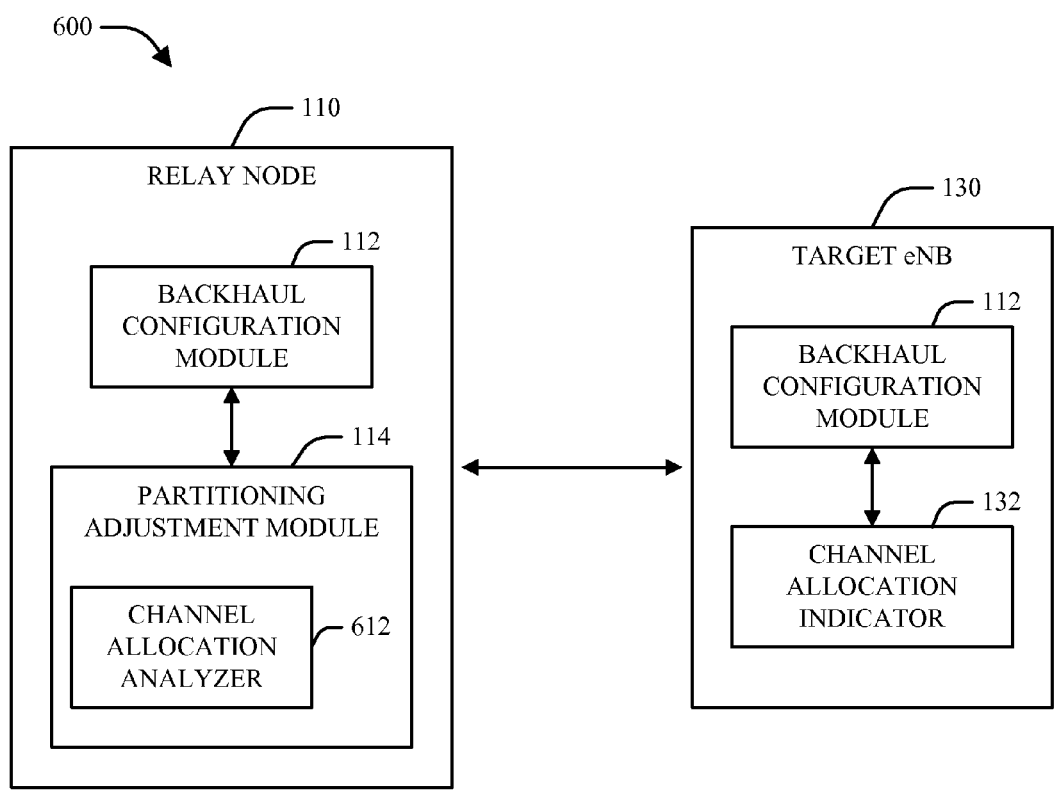
FIG. 6 is a block diagram of another system for configuring a resource partitioning utilized by a relay node in connection with a relay handover in accordance with various aspects.

According to an alternative aspect, the relay node can switch its subframes and/or other resources from access to backhaul or vice versa in response to information obtained from a destination eNB (e.g., a RACH allocation of the destination eNB, etc.) in order to facilitate itself for handover. This is illustrated by system 600 in FIG. 6. As illustrated by system 600, a RN 110 can utilize a backhaul configuration module or other mechanisms to identify an allocation of access subframes and backhaul subframes associated with backhaul communication. Subsequently, upon initializing a handover from a source eNB to target eNB 130, a channel allocation analyzer 612 and/or other means can be utilized by RN 110 to obtain information relating to an access/backhaul subframe allocation utilized by target eNB 130. Based on the access/backhaul subframe allocation utilized by target eNB 130, a partitioning adjustment module 114 or other mechanisms at RN 110 can adjust one or more subframes in the allocation of access subframes and backhaul subframes.

In one example, adjustment of subframes in an allocation of access subframes and backhaul subframes utilized by RN 110 can occur prior to a requested handover. Further, RN 110 can adjust one or more subframes in its access/backhaul allocation in response to a RACH allocation utilized by target eNB 130. For example, RN 110 can adjust allocation of respective subframes such that a RACH occasion assigned by target eNB 130 occurs on an UL backhaul subframe with target eNB 130. Additionally or alternatively, RN 110 can adjust allocation of respective subframes such that a RAR transmitted by target eNB 130 occurs on a DL backhaul subframe with target eNB 130.

According to an aspect, RN 110 can utilize partitioning adjustment module 114 to adjust one or more subframes in an allocation of access subframes and backhaul subframes in order to facilitate substantial conformance with an access/backhaul subframe allocation utilized by target eNB 130. For example, if a subframe allocated as access by RN 110 is allocated for backhaul at target eNB 130, partitioning adjustment module 114 can facilitate switching the subframe from access to backhaul at RN 110. In one example, RN 110 can indicate a result of such adjusting to one or more UEs (not shown in system 600) served by RN 110, thereby enabling the UE(s) to adjust their communication schedule with RN 110 such that no communication from the UE(s) to RN 110 is conducted on the backhaul subframes of RN 110.

In an additional example, partitioning adjustment as performed by RN 110 in system 600 can take non-MBSFN subframes and/or other non-removable access subframes into consideration in a similar manner to that described with respect to system 400. Thus, partitioning adjustment module 114 can be operable to adjust one or more subframes in an allocation of access subframes and backhaul subframes such that respective non-MBSFN subframes are allocated as access subframes.

While systems 400 and 600 and their corresponding description describe various techniques by which access and backhaul resources can be partitioned for a relay node, it should be appreciated that other techniques could be utilized and that, unless explicitly stated otherwise, the claimed subject matter is not intended to be limited to any specific technique(s). Further, it should be appreciated that the techniques described herein could be combined with each other and/or other suitable techniques in any suitable manner.

Figure 7:
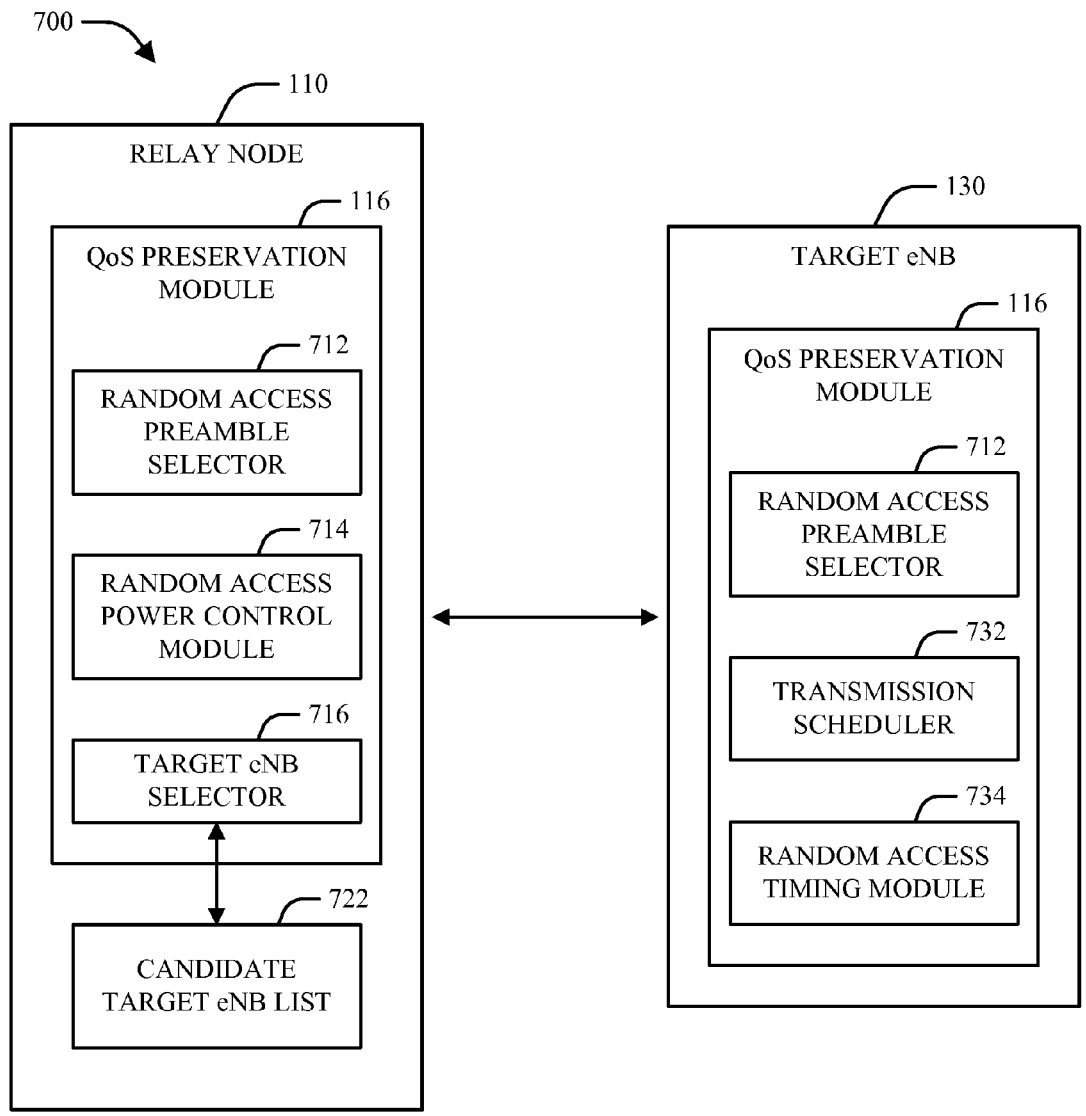
FIG. 7 is a block diagram of a system for maintaining required QoS associated with a relay handover in accordance with various aspects.

In accordance with yet another aspect, it can be appreciated that relay handover can in some cases require higher reliability and quality of service (QoS) due to the fact that the relay can potentially serve a large number of UEs. For example, as described above, if a radio link failure and/or other failure occurs during a relay handover, substantially all relay UEs could in some cases lose their backhaul connection for a prolonged period of time. Accordingly, it would be desirable to implement techniques by which QoS can be preserved in association with a relay handover. Various measures that can be implemented to the furtherance of these and related ends are illustrated by system 700 in FIG. 7.

In one example, RN 110 can be equipped with a QoS preservation module 116 or other suitable means to ensure that QoS requirements associated with a relay handover to target eNB 130 are maintained. For example, upon initializing a relay handover to target eNB 130, QoS preservation module 116 can identify a QoS requirement for the relay handover and direct communication in connection with the relay handover such that the QoS requirement for the relay handover is substantially preserved. Correspondingly, target eNB 130 can additionally or alternatively utilize a QoS preservation module 116 and/or other suitable means to maintain QoS targets for a relay handover. For example, target eNB 130 can be operable to detect a requested initialization of communication service for RN 110 in association with a handover of RN 110, based on which QoS preservation module 116 can identify a QoS requirement for the handover of RN 110 and direct communication in connection with the handover of RN 110 such that the QoS requirement for the handover of RN 110 is substantially preserved.

In accordance with one aspect, QoS preservation modules 116 at RN 110 and/or target eNB 130 can direct communication of random access signaling associated with a handover of RN 110, such as PRACH signaling or the like, such that the QoS requirement for the handover is substantially preserved. By way of non-limiting example, this can be achieved by improving the detectability of PRACH and/or reducing the number of PRACH attempts. In a first example, a random access preamble configuration can be chosen such that longer preamble sequences can be used to increase preamble energy. Thus, for example, a QoS preservation module 116 associated with RN 110 and/or target eNB 130 can be associated with a random access preamble selector 712 or the like in order to increase length of respective preamble sequences associated with random access signaling.

In a second example, initial PRACH transmission power can be increased in order to reduce PRACH attempts. Thus, for example, RN 110 can utilize a random access power control module 714 and/or other suitable mechanisms to increase transmission power for initial random access signaling performed in connection with the relay handover. In a further example, power can be increased for initial random access signaling based on a predefined relay power offset and/or any other suitable power offset associated with RN 110.

In a third example, target eNB 130 can be configured to avoid scheduling any transmissions in the relay random access region in order to avoid collisions with random access signaling transmitted by RN 110. Thus, for example, a transmission scheduler 732 and/or other mechanisms associated with target eNB 130 can be operable to identify a random access region associated RN 110 in connection with a handover of RN 110 and abstain from scheduling transmissions on the random access region associated with RN 110. Additionally, target eNB 130 can schedule re-transmissions that would interfere with relay PRACH using adaptive Hybrid Automatic Repeat Request (HARQ) such that the re-transmissions can be scheduled on different resources. Put another way, transmission scheduler 732 can configure respective re-transmissions such that respective re-transmissions identified as potentially conflicting with the random access region associated with RN 110 in connection with the handover of RN 110 are adaptively scheduled on resources disparate from resources corresponding to the random access region associated with RN 110.

In a fourth example, RARs can be configured to be sent within system 700 with minimum delay. Thus, for example, RN 110 can have a decreased time window compared to regular UEs corresponding to a maximum acceptable time interval at which a RAR can be received from target eNB 130 following random access signaling performed in connection with a relay handover. Correspondingly, target eNB 130 can be configured with a decreased time interval with which a RAR is transmitted to RN 110 in response to random access signaling provided by RN 110 in connection with a handover of RN 110. In one example, if a RAR does not arrive at RN 110 within the acceptable time window, RN 110 can direct re-transmission of the random access signaling, and/or the access attempt can be otherwise repeated. Accordingly, by utilizing reduced time intervals for a random access procedure relating to a relay handover in this manner, it can be appreciated that the relay handover can be restarted substantially quickly (e.g., on the order of milliseconds) upon failure of the random access procedure as compared to that for a standard UE.

According to one aspect, one or more of the techniques provided above to ensure QoS targets associated with a relay handover can be adjustable based on a number of users associated with RN 110. Thus, for example, if RN 110 is associated with no or substantially few users, handover of RN 110 can be conducted in a similar manner to handover of a UE. In another example, the number and/or extent of techniques utilized for a relay handover of RN 110 can be scalable based on the number of users served by RN 110.

According to another aspect, RN 110 can have more than one candidate target eNB when handing over. This set of candidate target eNBs can be managed by RN 110, a serving eNB for RN 110, and/or any other suitable entity. Accordingly, if the initial handover attempt fails, the serving eNB for RN 110 can instruct the relay to hand over to an alternative candidate eNB. In another example, RN 110 can identify a plurality of candidate target donor eNBs, such as those corresponding to a candidate target eNB list 722. Subsequently, in response to detecting failure of a relay handover to a target donor eNB, a target eNB selector 716 or other means can initialize an alternative relay handover to a candidate target donor eNB selected from the plurality of candidate target donor eNBs.

Referring now to FIGS. 8-14, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 8:
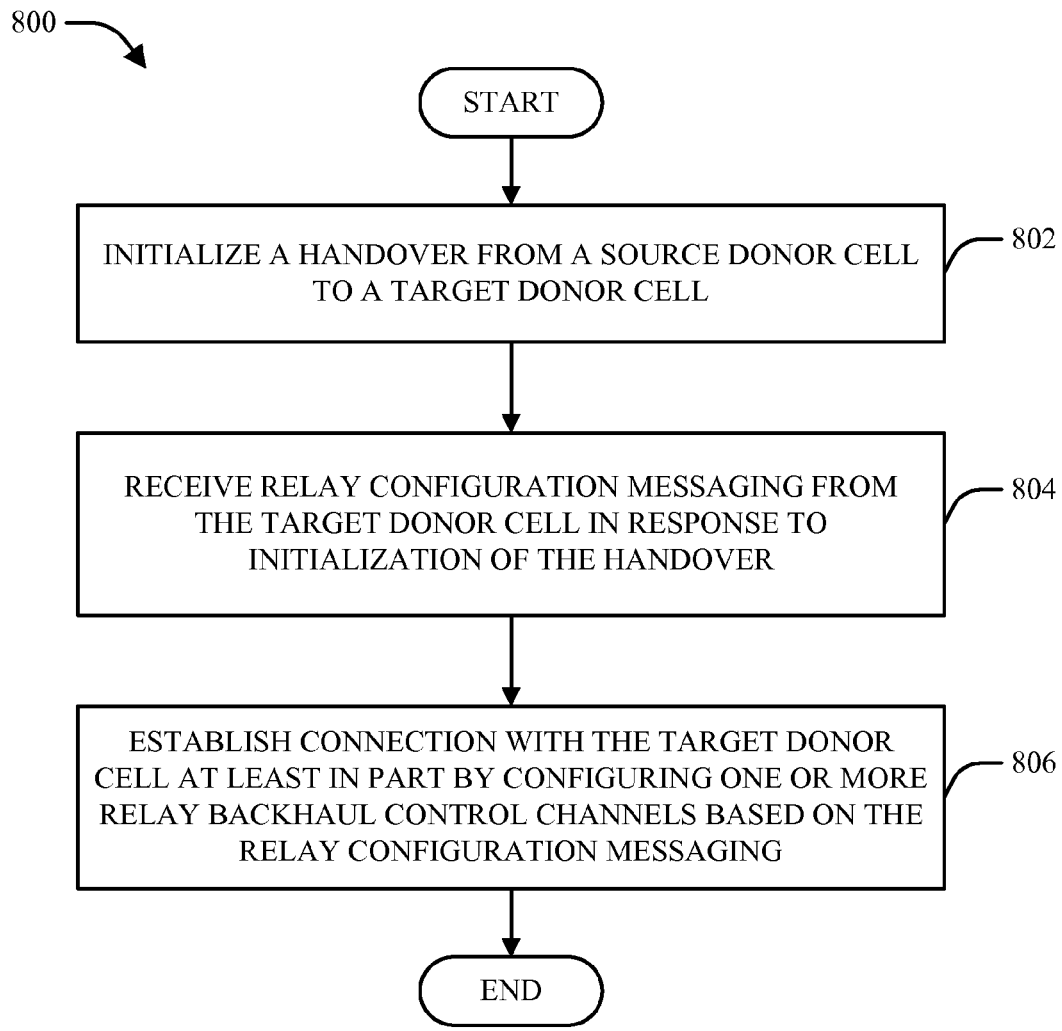
FIGS. 8-14 are flow diagrams that illustrate respective methods for managing mobility of a relay node within a wireless communication environment.

With reference to FIG. 8, illustrated is a first method 800 for managing mobility of a relay node within a wireless communication environment. It is to be appreciated that method 800 can be performed by, for example, a relay node (e.g., RN 110) and/or any other appropriate network entity. Method 800 begins at block 802, wherein a handover from a source donor cell (e.g., source eNB 120) to a target donor cell (e.g., target eNB 130) is initialized. At block 804, relay configuration messaging is received from the target donor cell in response to initialization of the handover. At block 806, a connection with the target donor cell is established at least in part by configuring one or more relay backhaul control channels based on the relay configuration messaging.

Figure 9:
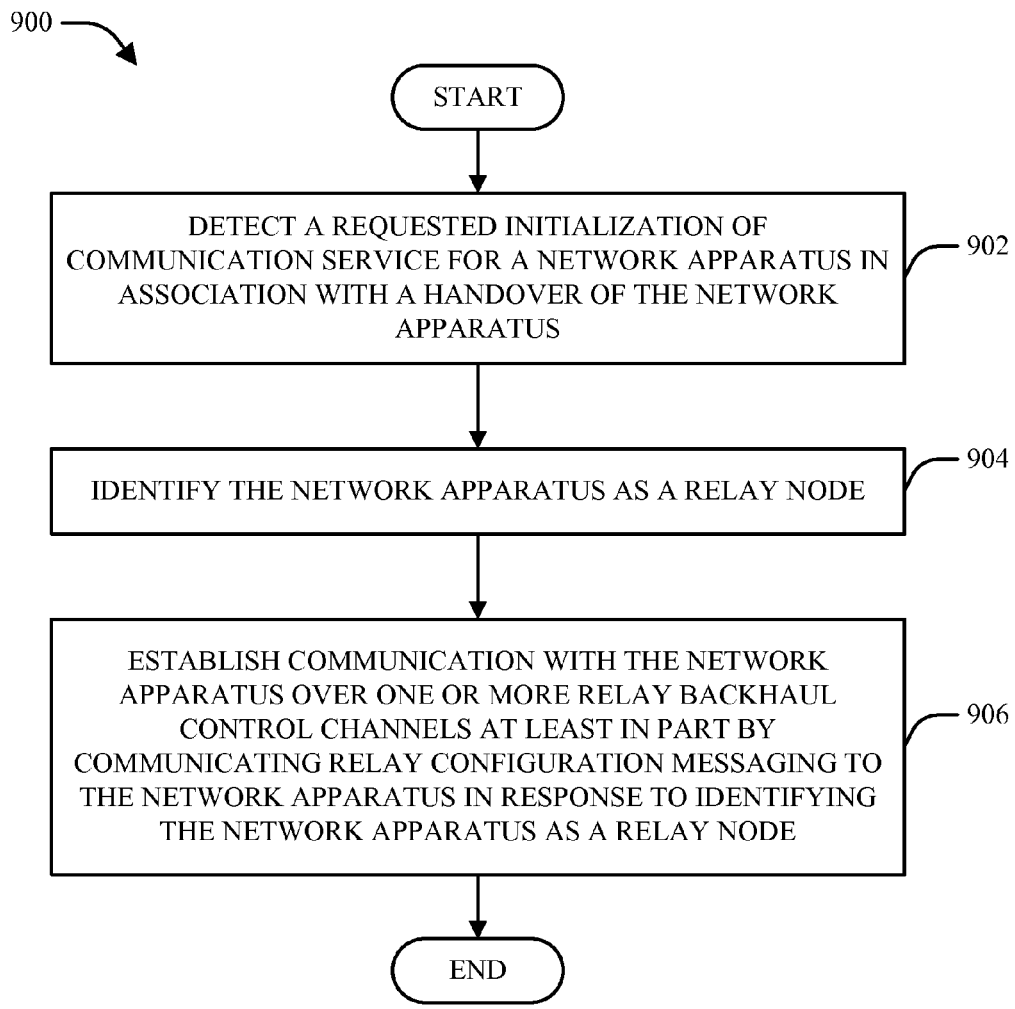

Turning now to FIG. 9, a flow diagram of a second method 900 for managing mobility of a relay node within a wireless communication environment is illustrated. Method 900 can be performed by, for example, a target donor cell of a relay handover (e.g., target eNB 130) and/or any other appropriate network entity. Method 900 begins at block 902, wherein a requested initialization of communication service for a network apparatus (e.g., RN 110) is detected in association with a handover of the network apparatus. At block 904, the network apparatus is identified as a relay node. At block 906, communication with the network apparatus is established over one or more relay backhaul control channels at least in part by communicating relay configuration messaging to the network apparatus in response to identifying the network apparatus as a relay node.

Figure 10:
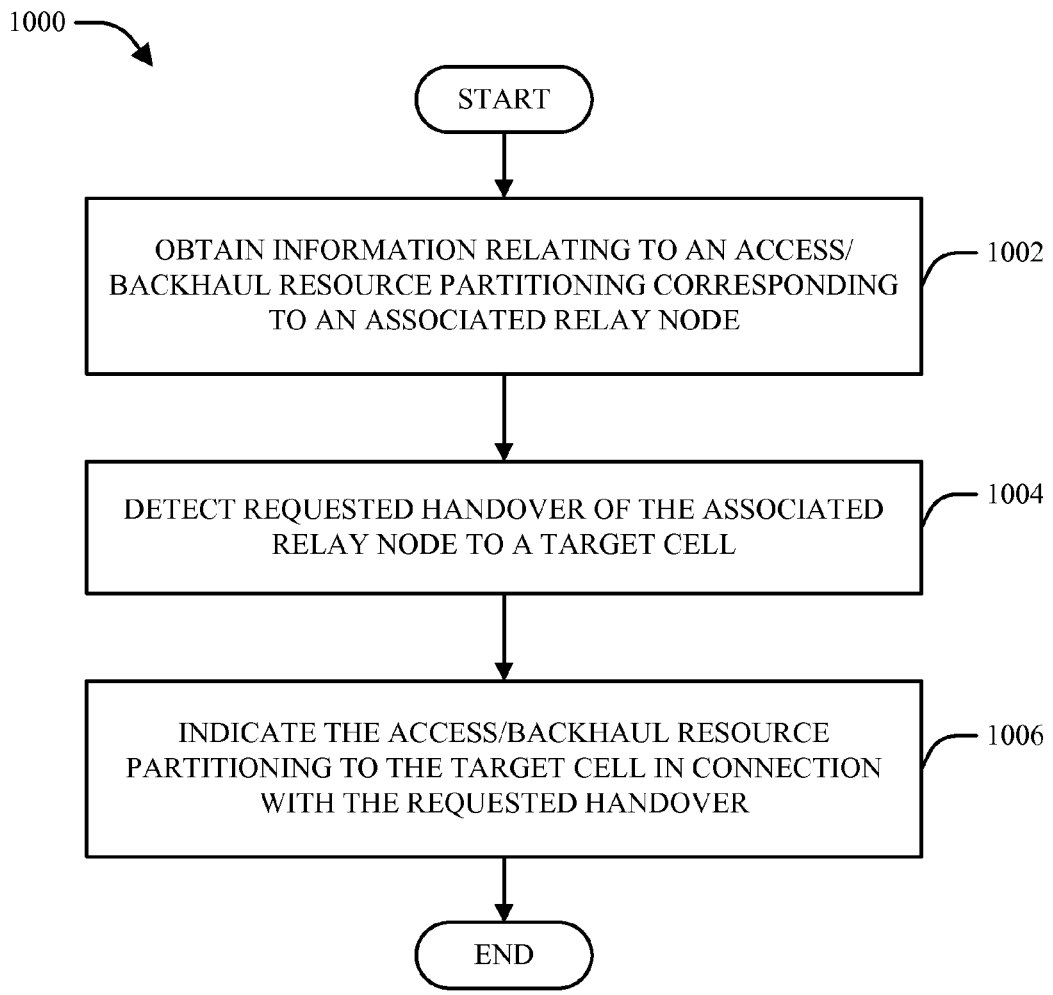

FIG. 10 illustrates a third method 1000 for managing mobility of a relay node within a wireless communication environment. Method 1000 can be performed by, for example, a source donor cell of a relay handover (e.g., source eNB 120) and/or any other suitable network entity. Method 1000 begins at block 1002, wherein information is obtained relating to an access/backhaul resource partitioning corresponding to an associated relay node. At block 1004, a requested handover of the associated relay node to a target cell is detected. At block 1006, the access/backhaul resource partitioning is indicated to the target cell in connection with the requested handover.

Figure 11:
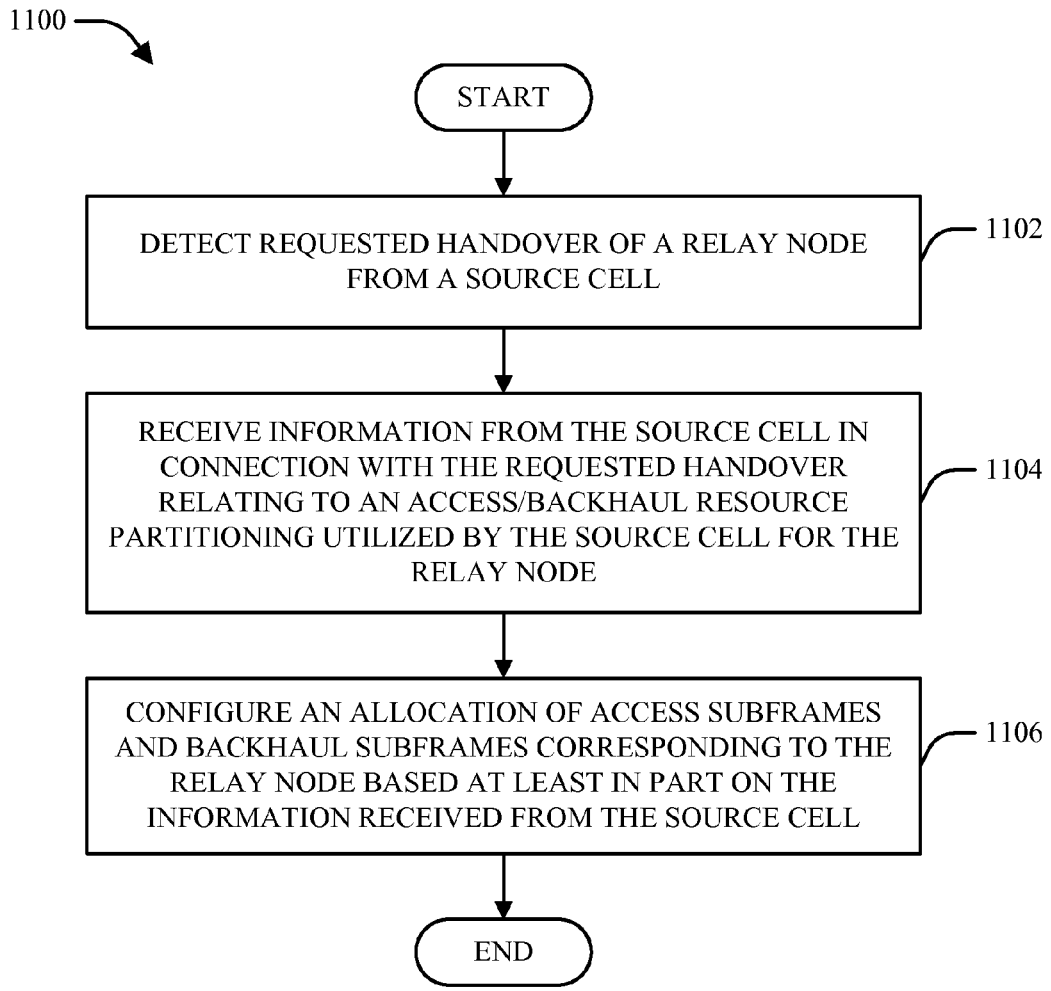

With reference next to FIG. 11, illustrated is a fourth method 1100 for managing mobility of a relay node within a wireless communication environment. Method 1100 can be performed by, for example, a destination cell of a relay handover and/or any other appropriate network entity. Method 1100 begins at block 1102, wherein requested handover of a relay node from a source cell is detected. At block 1104, information is received from the source cell in connection with the requested handover relating to an access/backhaul resource partitioning utilized by the source cell for the relay node. At block 1106, an allocation of access subframes and backhaul subframes corresponding to the relay node is configured based at least in part on the information received from the source cell.

Figure 12:
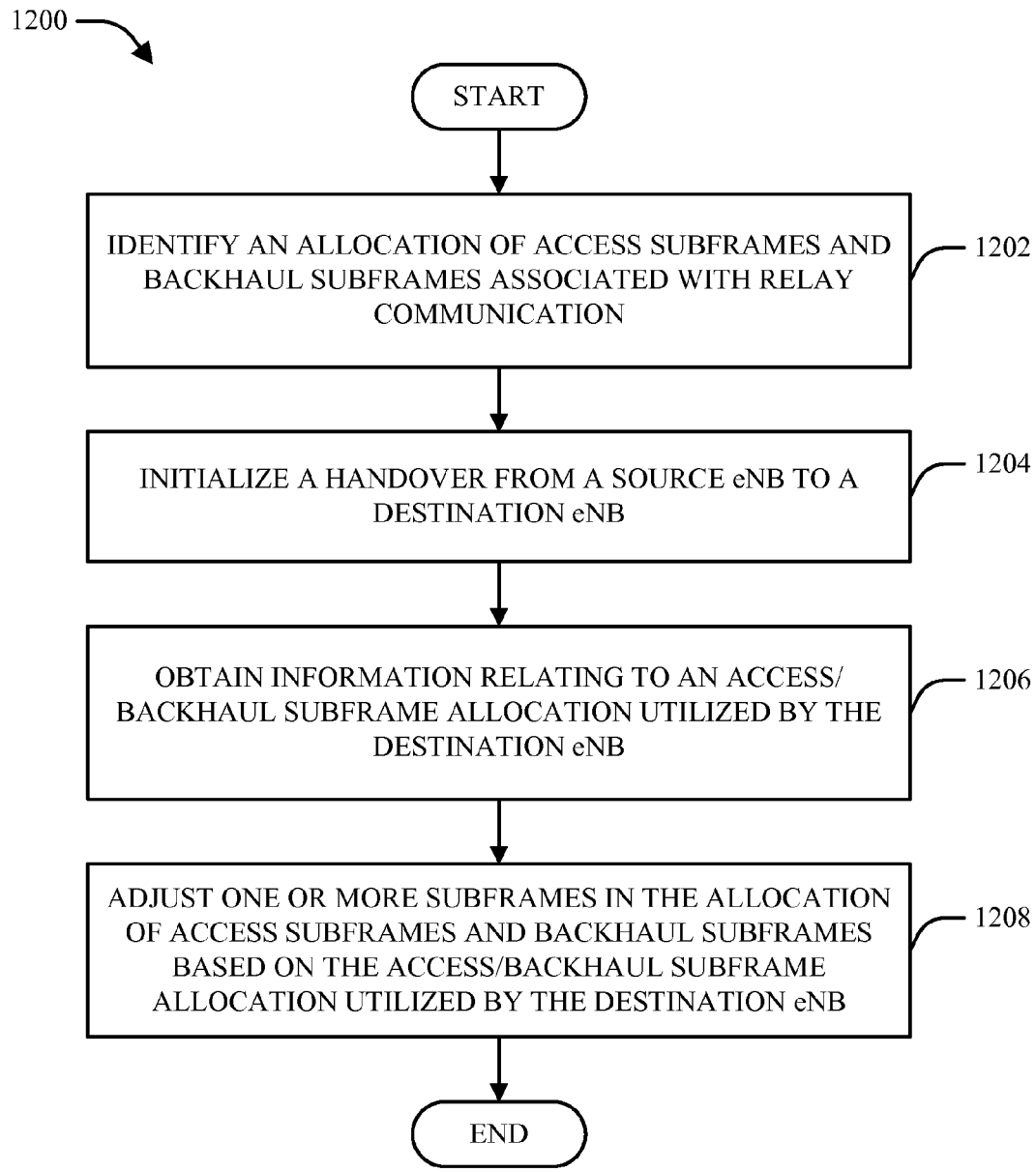

Turning to FIG. 12, a flow diagram of a fifth method 1200 for managing mobility of a relay node within a wireless communication environment is illustrated. Method 1200 can be performed by, for example, a relay node and/or any other appropriate network entity. Method 1200 begins at block 1202, wherein an allocation of access subframes and backhaul subframes associated with relay communication is identified. At block 1204, a handover from a source eNB to a destination eNB is initialized. At block 1206, information is obtained relating to an access/backhaul subframe allocation utilized by the destination eNB. At block 1208, one or more subframes in the allocation of access subframes and backhaul subframes are adjusted based on the access/backhaul subframe allocation utilized by the destination eNB.

Figure 13:
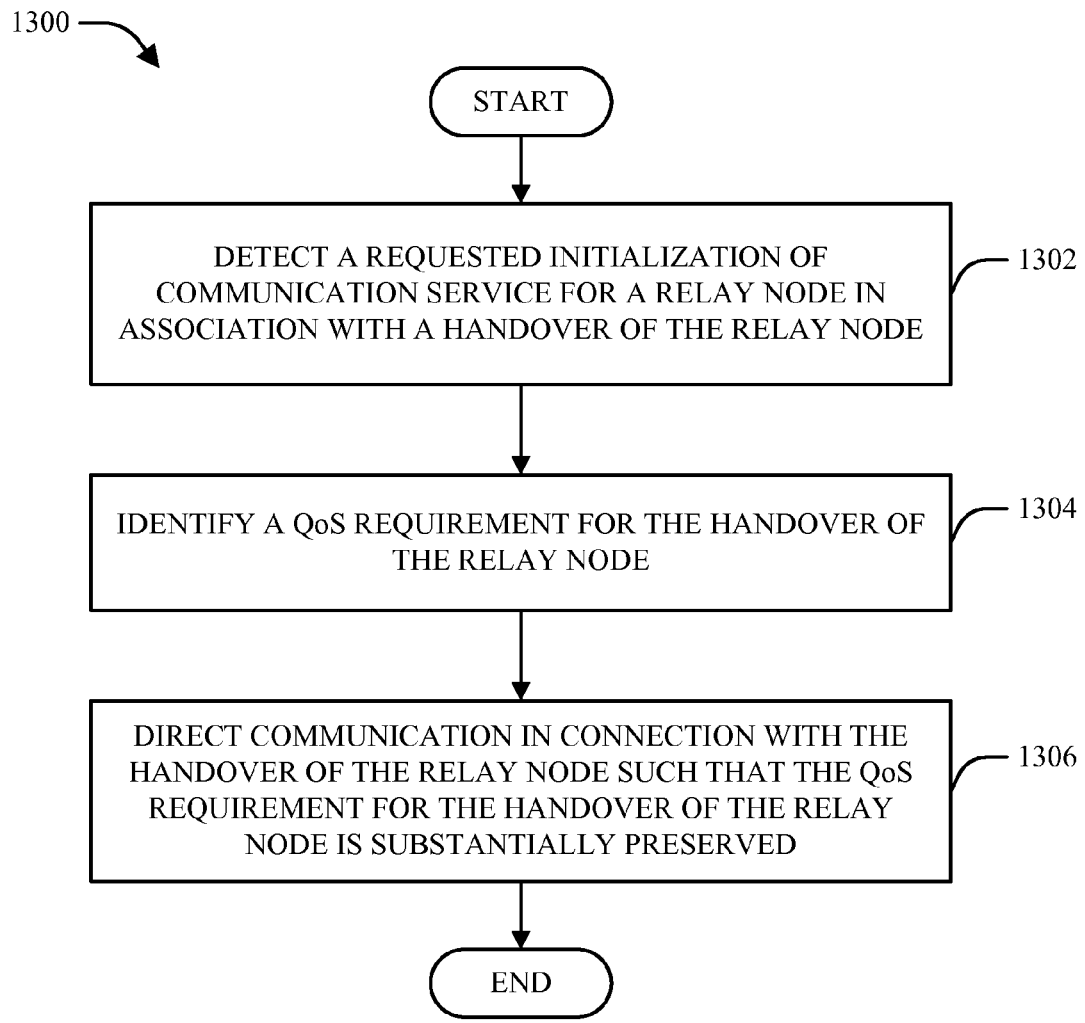

FIG. 13 illustrates a sixth method 1300 for managing mobility of a relay node within a wireless communication environment. Method 1300 can be performed by, for example, a donor cell involved in a relay handover and/or any other suitable network entity. Method 1300 begins at block 1302, wherein a requested initialization of communication service for a relay node in association with a handover of the relay node is detected. At block 1304, a QoS requirement for the handover of the relay node is identified. At block 1306, communication in connection with the handover of the relay node is directed such that the QoS requirement for the handover of the relay node is substantially preserved.

Figure 14:
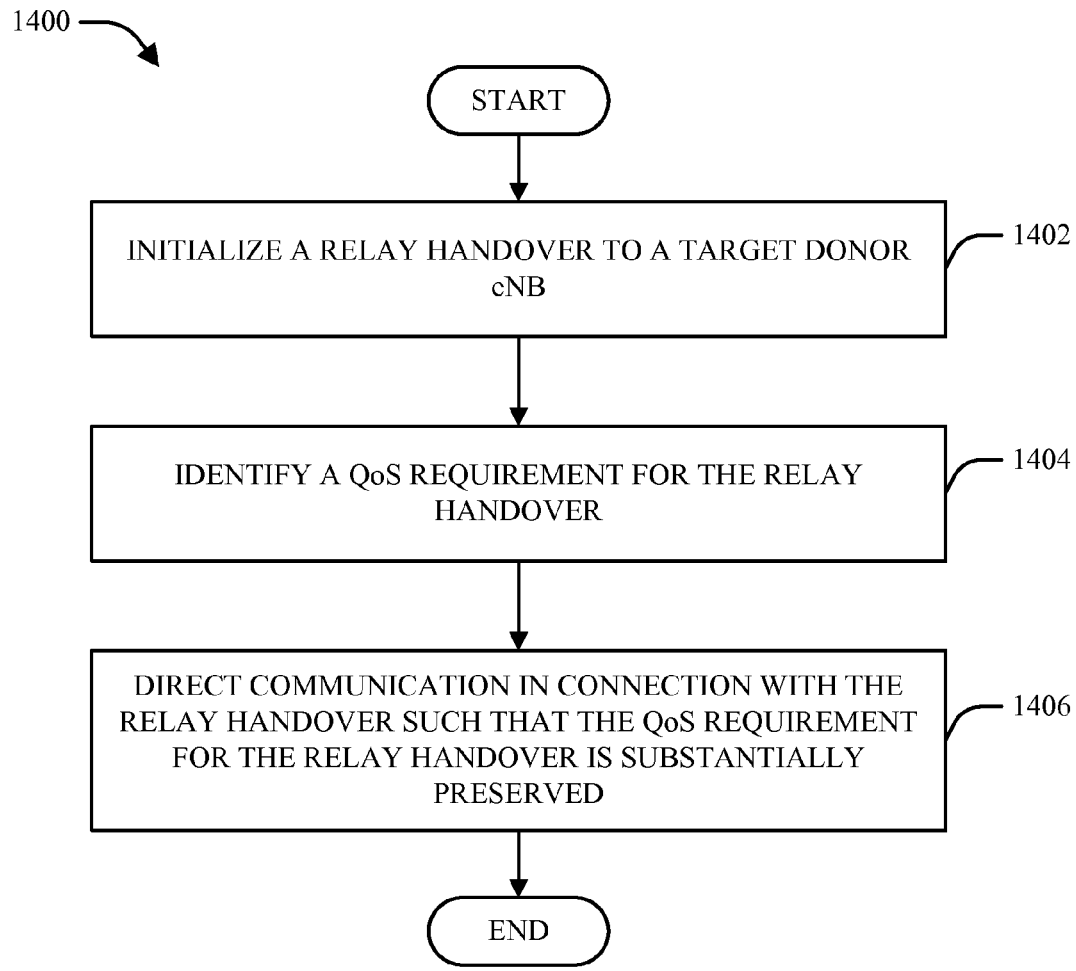

FIG. 14 illustrates a seventh method 1400 for managing mobility of a relay node within a wireless communication environment. Method 1400 can be performed by, for example, a relay node and/or any other suitable network entity. Method 1400 begins at block 1402, wherein a relay handover to a target donor eNB is initialized. At block 1404, a QoS requirement for the relay handover is identified. At block 1406, communication in connection with the relay handover is directed such that the QoS requirement for the relay handover is substantially preserved.

Referring next to FIGS. 15-21, respective apparatuses 1500-2100 that can be utilized in connection with various aspects herein are illustrated. It is to be appreciated that apparatuses 1500-2100 are represented as including functional blocks, which can be functional blocks that represent functions implemented by a processor, software, or combination thereof (e.g., firmware).

Figure 15:
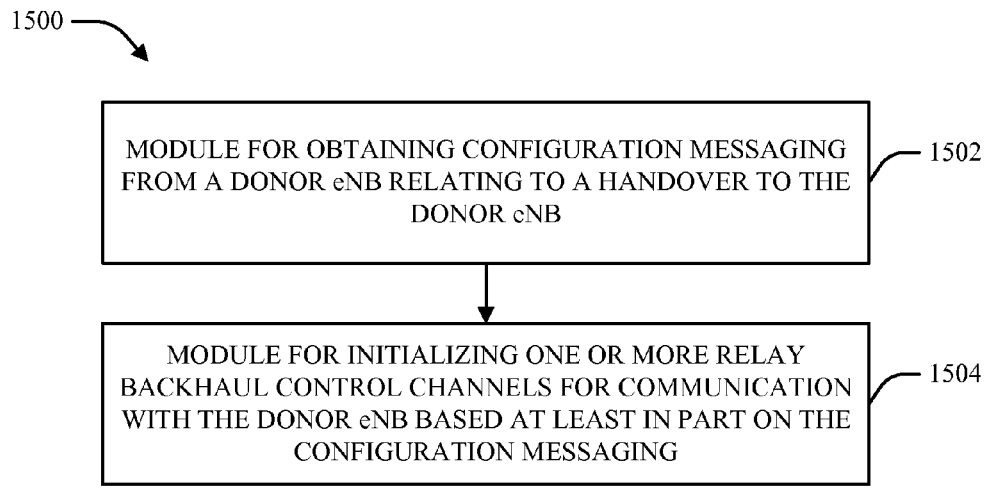
FIGS. 15-21 are block diagrams of respective apparatuses that facilitate coordination of a relay node handover within a wireless communication system.

Turning first to FIG. 15, a first apparatus 1500 that facilitates coordination of a relay node handover within a wireless communication system is illustrated. Apparatus 1500 can be implemented by a relay node (e.g., RN 110) and/or any other suitable network entity and can include a module 1502 for obtaining configuration messaging from a donor eNB relating to a handover to the donor eNB and a module 1504 for initializing one or more relay backhaul control channels for communication with the donor eNB based at least in part on the configuration messaging.

Figure 16:
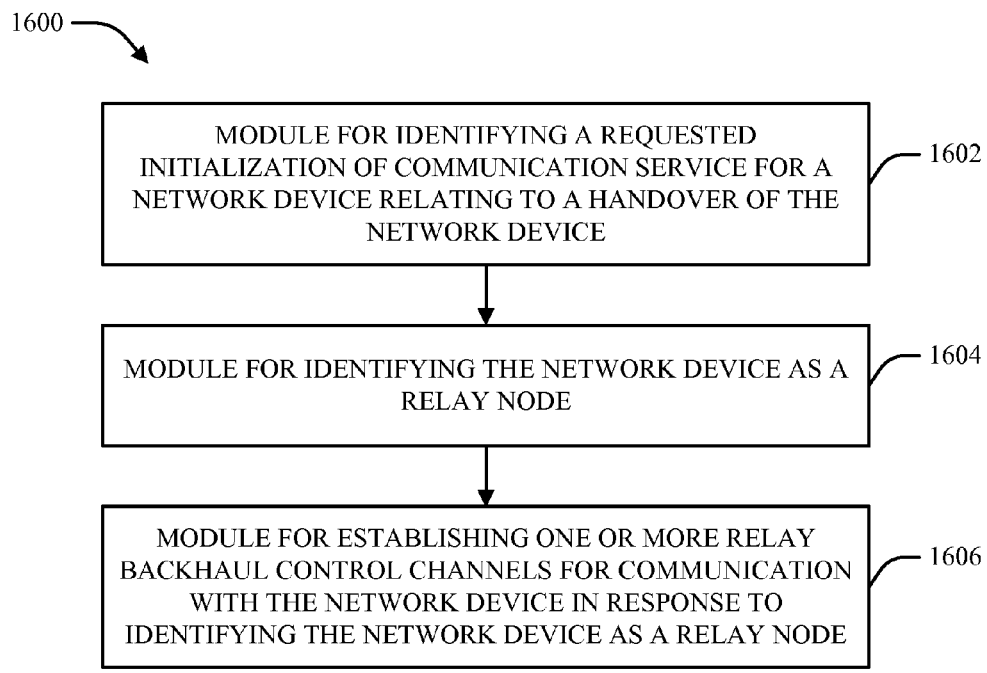

FIG. 16 illustrates a second apparatus 1600 that facilitates coordination of a relay node handover within a wireless communication system. Apparatus 1600 can be implemented by a target donor cell of a relay handover (e.g., target eNB 130) and/or any other suitable network entity and can include a module 1602 for identifying a requested initialization of communication service for a network device relating to a handover of the network device, a module 1604 for identifying the network device as a relay node, and a module 1606 for establishing one or more relay backhaul control channels for communication with the network device in response to identifying the network device as a relay node.

Figure 17:
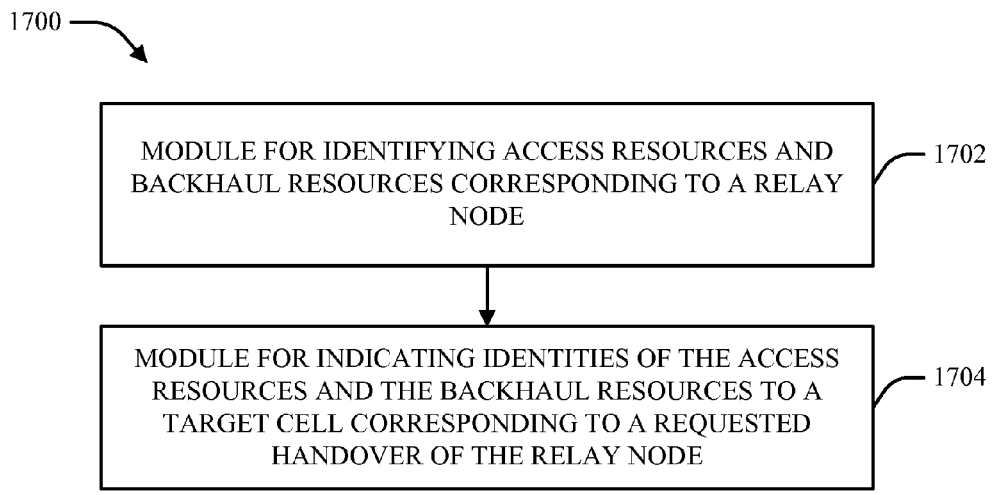

Referring next to FIG. 17, a third apparatus 1700 that facilitates coordination of a relay node handover within a wireless communication system is illustrated. Apparatus 1700 can be implemented by a source donor cell of a relay handover (e.g., source eNB 120) and/or any other suitable network entity and can include a module 1702 for identifying access resources and backhaul resources corresponding to a relay node and a module 1704 for indicating identities of the access resources and the backhaul resources to a target cell corresponding to a requested handover of the relay node.

Figure 18:
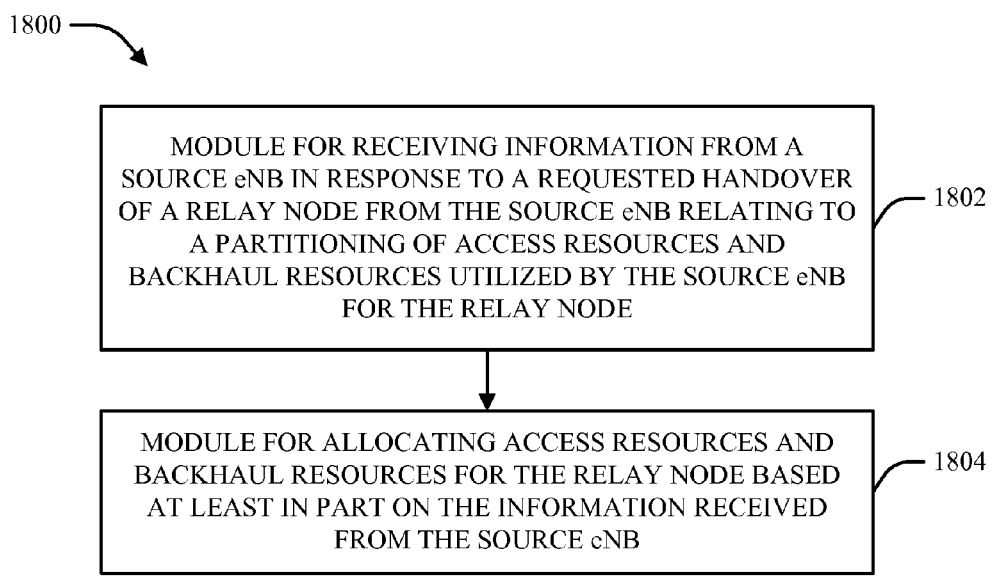

Turning now to FIG. 18, a fourth apparatus 1800 that facilitates coordination of a relay node handover within a wireless communication system is illustrated. Apparatus 1800 can be implemented by a target eNB involved in a relay handover and/or any other suitable network entity and can include a module 1802 for receiving information from a source eNB in response to a requested handover of a relay node from the source eNB relating to a partitioning of access resources and backhaul resources utilized by the source eNB for the relay node and a module 1804 for allocating access resources and backhaul resources for the relay node based at least in part on the information received from the source eNB.

Figure 19:
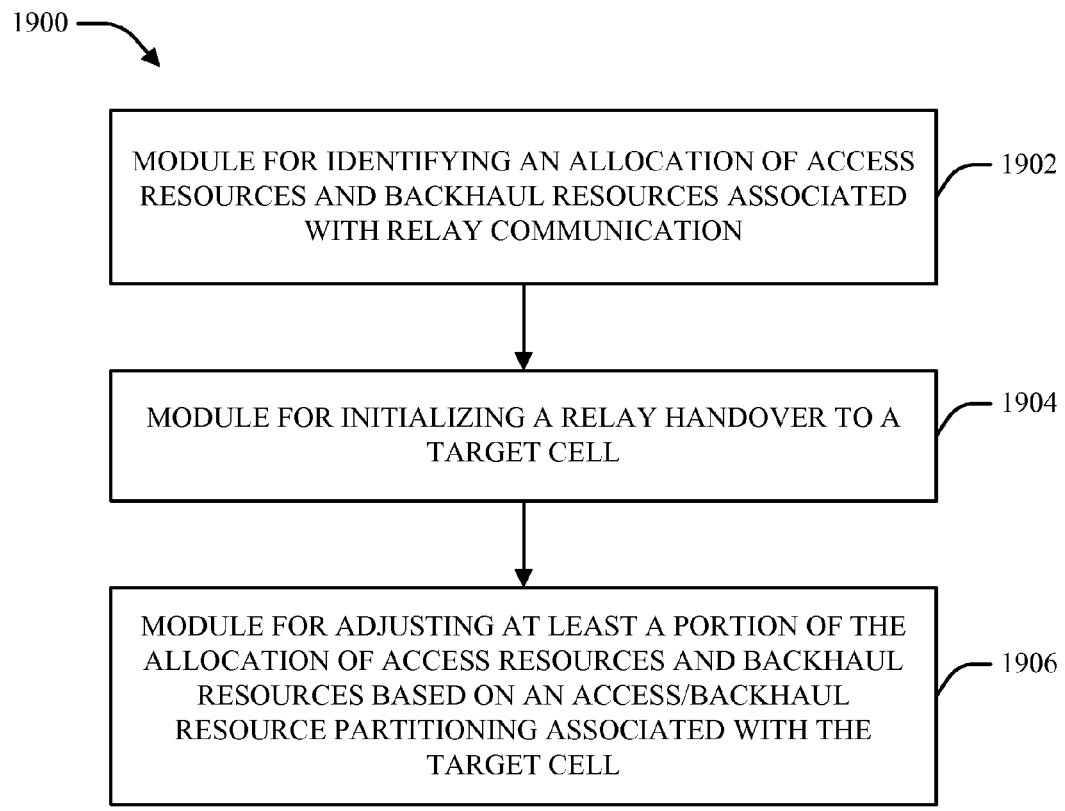

FIG. 19 illustrates a fifth apparatus 1900 that facilitates coordination of a relay node handover within a wireless communication system. Apparatus 1900 can be implemented by a relay and/or any other suitable network entity and can include a module 1902 for identifying an allocation of access resources and backhaul resources associated with relay communication, a module 1904 for initializing a relay handover to a target cell, and a module 1906 for adjusting at least a portion of the allocation of access resources and backhaul resources based on an access/backhaul resource partitioning associated with the target cell.

Figure 20:
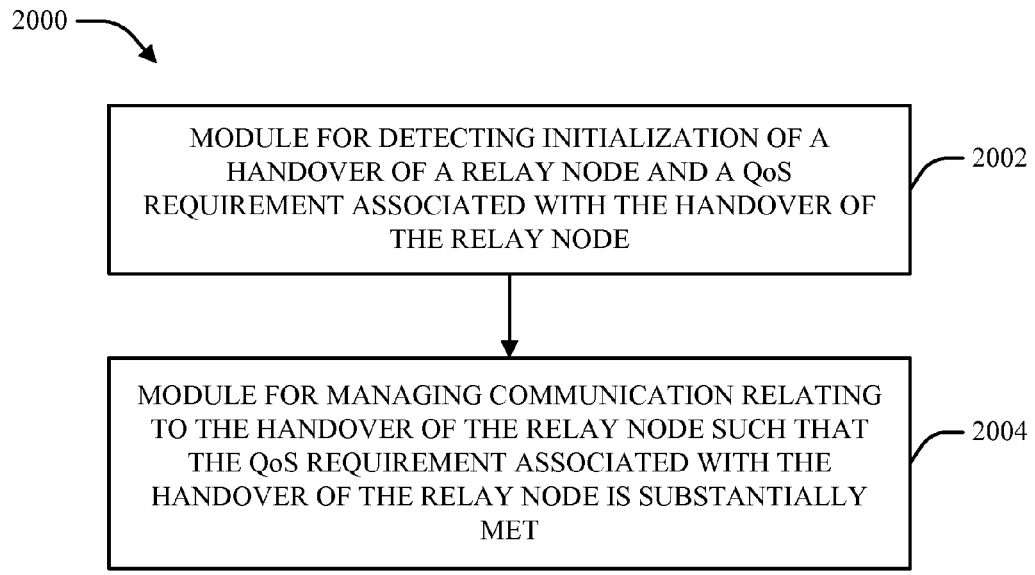

Referring to FIG. 20, a sixth apparatus 2000 that facilitates coordination of a relay node handover within a wireless communication system is illustrated. Apparatus 2000 can be implemented by a donor eNB conducting a relay handover and/or any other suitable network entity and can include a module 2002 for detecting initialization of a handover of a relay node and a QoS requirement associated with the handover of the relay node and a module 2004 for managing communication relating to the handover of the relay node such that the QoS requirement associated with the handover of the relay node is substantially met.

Figure 21:
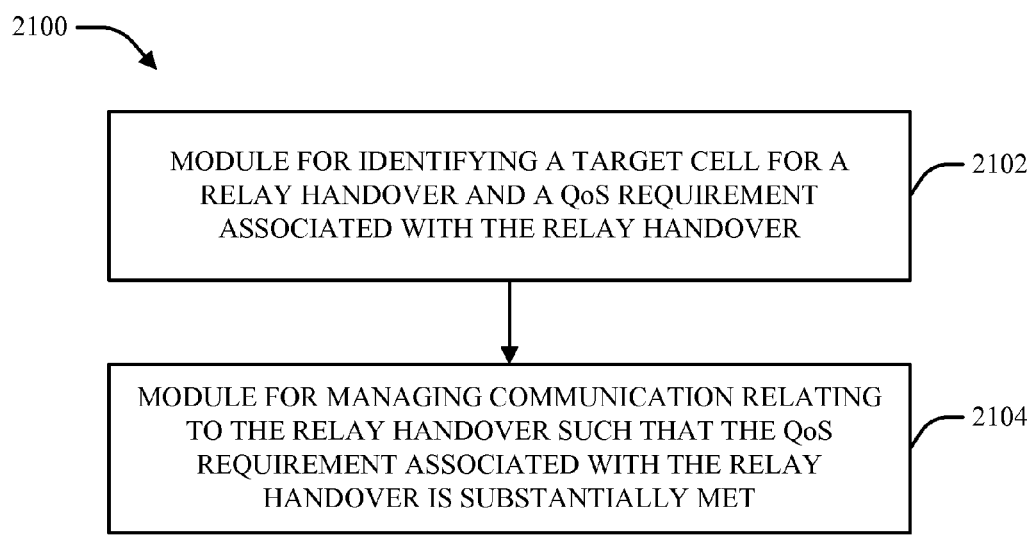

FIG. 21 illustrates a seventh apparatus 2100 that facilitates coordination of a relay node handover within a wireless communication system. Apparatus 2100 can be implemented by a relay node and/or any other suitable network entity and can include a module 2102 for identifying a target cell for a relay handover and a QoS requirement associated with the relay handover and a module 2104 for managing communication relating to the relay handover such that the QoS requirement associated with the relay handover is substantially met.

Figure 22:
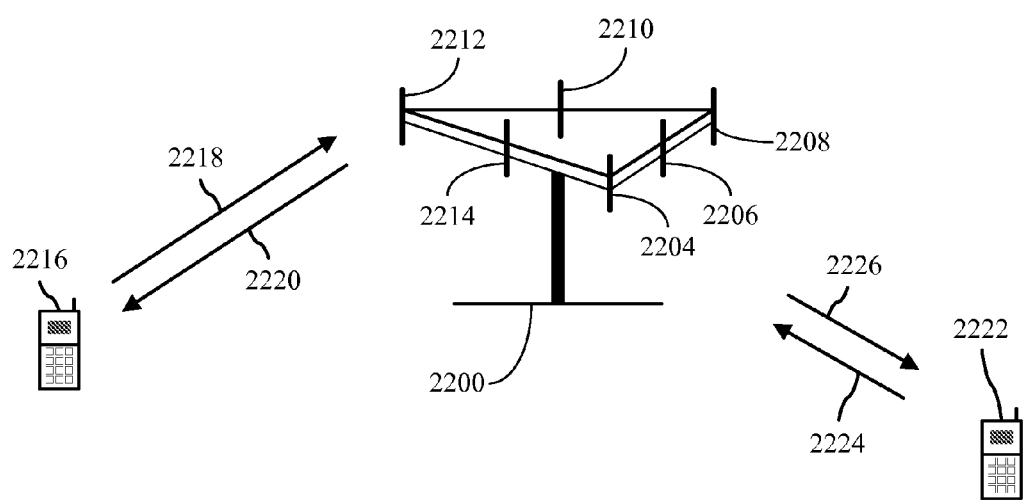
FIG. 22 illustrates a wireless multiple-access communication system in accordance with various aspects set forth herein.

Referring now to FIG. 22, an illustration of a wireless multiple-access communication system is provided in accordance with various aspects. In one example, an access point 2200 (AP) includes multiple antenna groups. As illustrated in FIG. 22, one antenna group can include antennas 2204 and 2206, another can include antennas 2208 and 2210, and another can include antennas 2212 and 2214. While only two antennas are shown in FIG. 22 for each antenna group, it should be appreciated that more or fewer antennas may be utilized for each antenna group. In another example, an access terminal 2216 can be in communication with antennas 2212 and 2214, where antennas 2212 and 2214 transmit information to access terminal 2216 over forward link 2220 and receive information from access terminal 2216 over reverse link 2218. Additionally and/or alternatively, access terminal 2222 can be in communication with antennas 2206 and 2208, where antennas 2206 and 2208 transmit information to access terminal 2222 over forward link 2226 and receive information from access terminal 2222 over reverse link 2224. In a frequency division duplex system, communication links 2218, 2220, 2224 and 2226 can use different frequency for communication. For example, forward link 2220 may use a different frequency then that used by reverse link 2218.

Each group of antennas and/or the area in which they are designed to communicate can be referred to as a sector of the access point. In accordance with one aspect, antenna groups can be designed to communicate to access terminals in a sector of areas covered by access point 2200. In communication over forward links 2220 and 2226, the transmitting antennas of access point 2200 can utilize beamforming in order to improve the signal-to-noise ratio of forward links for the different access terminals 2216 and 2222. Also, an access point using beamforming to transmit to access terminals scattered randomly through its coverage causes less interference to access terminals in neighboring cells than an access point transmitting through a single antenna to all its access terminals.

An access point, e.g., access point 2200, can be a fixed station used for communicating with terminals and can also be referred to as a base station, an eNB, an access network, and/or other suitable terminology. In addition, an access terminal, e.g., an access terminal 2216 or 2222, can also be referred to as a mobile terminal, user equipment, a wireless communication device, a terminal, a wireless terminal, and/or other appropriate terminology.

Figure 23:
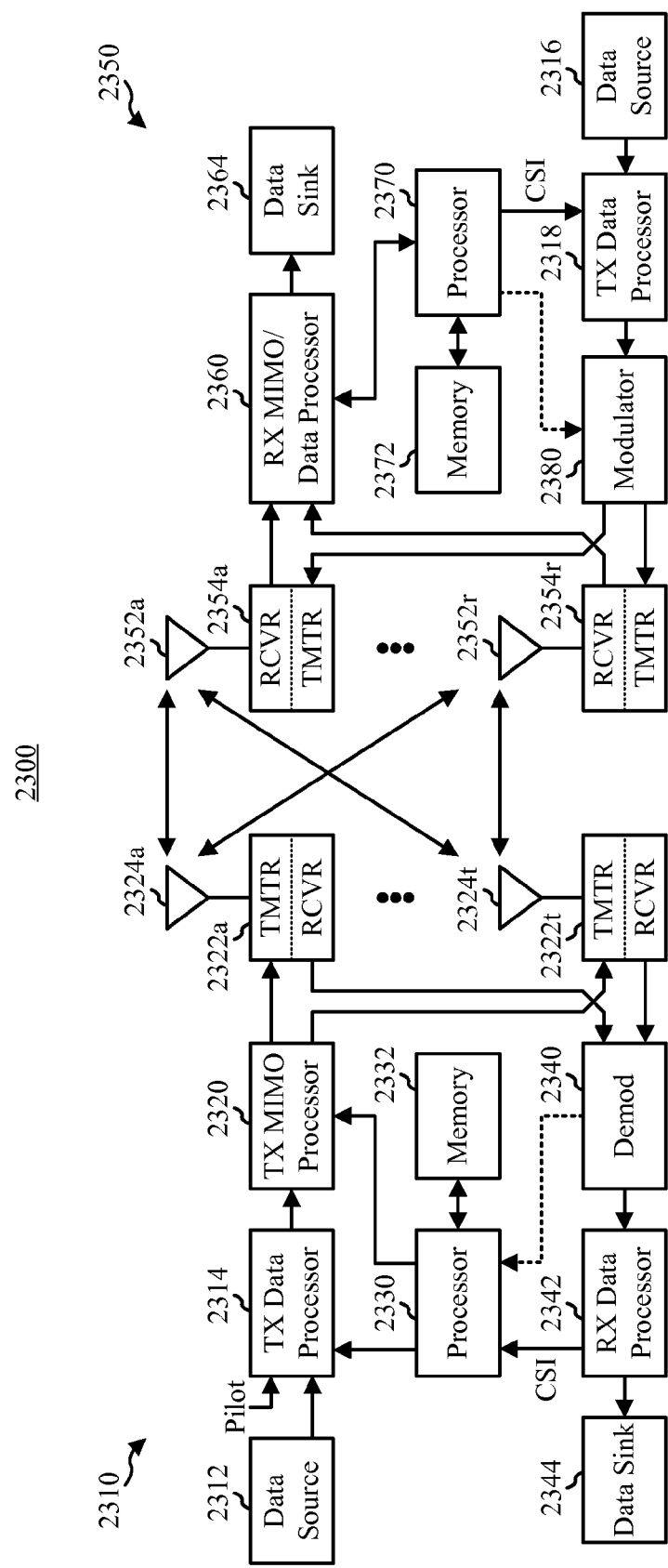
FIG. 23 is a block diagram illustrating an example wireless communication system in which various aspects described herein can function.

Referring now to FIG. 23, a block diagram illustrating an example wireless communication system 2300 in which various aspects described herein can function is provided. In one example, system 2300 is a multiple-input multiple-output (MIMO) system that includes a transmitter system 2310 and a receiver system 2350. It should be appreciated, however, that transmitter system 2310 and/or receiver system 2350 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 2310 and/or receiver system 2350 described herein could be utilized in connection with a single output to single input antenna system.

In accordance with one aspect, traffic data for a number of data streams are provided at transmitter system 2310 from a data source 2312 to a transmit (TX) data processor 2323. In one example, each data stream can then be transmitted via a respective transmit antenna 2324. Additionally, TX data processor 2314 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 2350 to estimate channel response. Back at transmitter system 2310, the multiplexed pilot and coded data for each data stream can be modulated (e.g., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 2330.

Next, modulation symbols for all data streams can be provided to a TX MIMO processor 2320, which can further process the modulation symbols (e.g., for OFDM). TX MIMO processor 2320 can then provides $N_T$ modulation symbol streams to $N_T$ transceivers 2322a through 2322t. In one example, each transceiver 2322 can receive and process a respective symbol stream to provide one or more analog signals. Each transceiver 2322 can then further condition (e.g., amplify, filter, and upconvert) the analog signals to provide a modulated signal suitable for transmission over a MIMO channel. Accordingly, $N_T$ modulated signals from transceivers 2322a through 2322t can then be transmitted from $N_T$ antennas 2324a through 2324t, respectively.

In accordance with another aspect, the transmitted modulated signals can be received at receiver system 2350 by $N_R$ antennas 2352a through 2352r. The received signal from each antenna 2352 can then be provided to respective transceivers 2354. In one example, each transceiver 2354 can condition (e.g., filter, amplify, and downconvert) a respective received signal, digitize the conditioned signal to provide samples, and then processes the samples to provide a corresponding "received" symbol stream. An RX MIMO/data processor 2360 can then receive and process the $N_R$ received symbol streams from $N_R$ transceivers 2354 based on a particular receiver processing technique to provide $N_T$ "detected" symbol streams. In one example, each detected symbol stream can include symbols that are estimates of the modulation symbols transmitted for the corresponding data stream. RX processor 2360 can then process each symbol stream at least in part by demodulating, deinterleaving, and decoding each detected symbol stream to recover traffic data for a corresponding data stream. Thus, the processing by RX processor 2360 can be complementary to that performed by TX MIMO processor 2320 and TX data processor 2314 at transmitter system 2310. RX processor 2360 can additionally provide processed symbol streams to a data sink 2364.

In accordance with one aspect, the channel response estimate generated by RX processor 2360 can be used to perform space/time processing at the receiver, adjust power levels, change modulation rates or schemes, and/or other appropriate actions. Additionally, RX processor 2360 can further estimate channel characteristics such as, for example, signal-to-noise-and-interference ratios (SNRs) of the detected symbol streams. RX processor 2360 can then provide estimated channel characteristics to a processor 2370. In one example, RX processor 2360 and/or processor 2370 can further derive an estimate of the "operating" SNR for the system. Processor 2370 can then provide channel state information (CSI), which can comprise information regarding the communication link and/or the received data stream. This information can include, for example, the operating SNR. The CSI can then be processed by a TX data processor 2318, modulated by a modulator 2380, conditioned by transceivers 2354a through 2354r, and transmitted back to transmitter system 2310. In addition, a data source 2316 at receiver system 2350 can provide additional data to be processed by TX data processor 2318.

Back at transmitter system 2310, the modulated signals from receiver system 2350 can then be received by antennas 2324, conditioned by transceivers 2322, demodulated by a demodulator 2340, and processed by a RX data processor 2342 to recover the CSI reported by receiver system 2350. In one example, the reported CSI can then be provided to processor 2330 and used to determine data rates as well as coding and modulation schemes to be used for one or more data streams. The determined coding and modulation schemes can then be provided to transceivers 2322 for quantization and/or use in later transmissions to receiver system 2350. Additionally and/or alternatively, the reported CSI can be used by processor 2330 to generate various controls for TX data processor 2314 and TX MIMO processor 2320. In another example, CSI and/or other information processed by RX data processor 2342 can be provided to a data sink 2344.

In one example, processor 2330 at transmitter system 2310 and processor 2370 at receiver system 2350 direct operation at their respective systems. Additionally, memory 2332 at transmitter system 2310 and memory 2372 at receiver system 2350 can provide storage for program codes and data used by processors 2330 and 2370, respectively. Further, at receiver system 2350, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method performed by a target cell, comprising:
   detecting a requested handover of a relay node from a source cell to the target cell;

receiving information from the source cell in connection with the requested handover, relating to an access/backhaul resource partitioning utilized by the source cell for the relay node; and configuring an allocation of access subframes and backhaul subframes corresponding to the relay node, based at least in part on the information received from the source cell, such that a random access response (RAR) transmitted to the relay node occurs on a downlink backhaul subframe corresponding to the relay node.

2. The method of claim 1, wherein the receiving comprises receiving the information from the source cell prior to the requested handover.

3. The method of claim 1, wherein the configuring comprises configuring an allocation of access subframes and backhaul subframes corresponding to the relay node that substantially preserves the access/backhaul resource partitioning utilized by the source cell for the relay node.

4. The method of claim 1, wherein the configuring comprises configuring an allocation of access subframes and backhaul subframes corresponding to the relay node such that an assigned random access channel (RACH) occasion associated with the relay node occurs on an uplink backhaul subframe corresponding to the relay node.

5. The method of claim 1, wherein the configuring comprises configuring an allocation of access subframes and backhaul subframes corresponding to the relay node such that respective non-Multimedia Broadcast over Single-Frequency Network (MBSFN) subframes corresponding to the relay node are allocated as access subframes.

6. The method of claim 5, wherein the configuring further comprises:
identifying a subframe offset corresponding to the relay node;
obtaining information relating to one or more predetermined non-MBSFN subframe positions within a given radio frame; and
determining the one or more predetermined non-MBSFN subframe positions within the given radio frame with respect to the relay node based on the subframe offset corresponding to the relay node.

7. The method of claim 1, further comprising transmitting information to the relay node that indicates the allocation of access subframes and backhaul subframes corresponding to the relay node.

8. The method of claim 7, wherein the transmitting comprises transmitting the information to the relay node during the requested handover of the relay node or after the requested handover of the relay node.

9. The method of claim 7, wherein the transmitting comprises transmitting the information to the relay node using unicast layer 3 (L3) signaling.

10. A target cell, comprising:
a memory that stores data relating to a relay node, a source cell, and a requested handover of the relay node from the source cell to the target cell; and
a processor configured to receive information, from the source cell in connection with the requested handover, relating to an access/backhaul resource partitioning utilized by the source cell for the relay node, and to determine an allocation of access subframes and backhaul subframes corresponding to the relay node, based at least in part on the information received from the source cell, such that a random access response (RAR) transmitted to the relay node occurs on a downlink backhaul subframe corresponding to the relay node.

11. The target cell of claim 10, wherein the processor is further configured to determine an allocation of access subframes and backhaul subframes corresponding to the relay node that substantially preserves the access/backhaul resource partitioning utilized by the source cell for the relay node.

12. The target cell of claim 10, wherein the processor is further configured to determine an allocation of access subframes and backhaul subframes corresponding to the relay node such that an assigned random access channel (RACH) occasion associated with the relay node occurs on an uplink backhaul subframe corresponding to the relay node.

13. The target cell of claim 10, wherein the processor is further configured to determine an allocation of access subframes and backhaul subframes corresponding to the relay node such that respective non-Multimedia Broadcast over Single-Frequency Network (MBSFN) subframes corresponding to the relay node are allocated as access subframes.

14. The target cell of claim 10, wherein the processor is further configured to transmit information to the relay node that relates to the allocation of access subframes and backhaul subframes corresponding to the relay node.

15. The target cell of claim 14, wherein the processor is further configured to transmit the information to the relay node via unicast layer 3 (L3) signaling during the requested handover of the relay node or after the requested handover of the relay node.

16. A target cell, comprising:
means for receiving information, from a source Evolved Node B (eNB) in response to a requested handover of a relay node from the source eNB to the target cell, relating to a partitioning of access resources and backhaul resources utilized by the source eNB for the relay node; and
means for allocating access resources and backhaul resources for the relay node, based at least in part on the information received from the source eNB, wherein the means for allocating comprises means for allocating access resources and backhaul resources for the relay node such that a random access response (RAR) transmitted to the relay node occurs on a downlink backhaul subframe corresponding to the relay node.

17. The target cell of claim 16, wherein the means for allocating comprises means for allocating access resources and backhaul resources for the relay node such that an assigned random access channel (RACH) occasion associated with the relay node occurs on an uplink backhaul subframe corresponding to the relay node.

18. The target cell of claim 16, wherein the means for allocating comprises means for allocating access resources and backhaul resources for the relay node such that respective non-Multimedia Broadcast over Single-Frequency Network (MBSFN) subframes corresponding to the relay node are allocated as access subframes.

19. The target cell of claim 16, further comprising means for communicating information to the relay node that indicates the access resources and backhaul resources for the relay node.

20. A computer program product, comprising:
a non-transitory computer-readable medium, comprising:
code for causing a computer to receive information, from a source Evolved Node B (eNB) in response to a requested handover of a relay node from the source eNB to a target cell, relating to a partitioning of access resources and backhaul resources utilized by the source eNB for the relay node; and code for causing a computer to allocate access resources and backhaul resources for the relay node, based at least in part on the information received from the source eNB, such that a random access response (RAR) transmitted to the relay node occurs on a downlink backhaul subframe corresponding to the relay node.

21. A method performed by a relay node, comprising:
identifying an allocation of access subframes and backhaul subframes associated with relay communication;
initializing a handover of the relay node from a source Evolved Node B (eNB) to a destination eNB;
obtaining information relating to an access/backhaul subframe allocation utilized by the destination eNB; and
adjusting one or more subframes in the allocation of access subframes and backhaul subframes, based on the access/backhaul subframe allocation utilized by the destination eNB, such that a random access response (RAR) transmitted by the destination eNB occurs on a downlink backhaul subframe.

22. The method of claim 21, wherein the adjusting comprises adjusting one or more subframes in the allocation of access subframes and backhaul subframes prior to the handover.

23. The method of claim 21, wherein the adjusting comprises adjusting one or more subframes in the allocation of access subframes and backhaul subframes in response to a random access channel (RACH) allocation utilized by the destination eNB.

24. The method of claim 23, wherein the adjusting further comprises adjusting one or more subframes in the allocation of access subframes and backhaul subframes such that a RACH occasion assigned by the destination eNB occurs on an uplink backhaul subframe with the destination eNB.

25. The method of claim 21, wherein the adjusting comprises adjusting one or more subframes in the allocation of access subframes and backhaul subframes to facilitate substantial conformance with the access/backhaul subframe allocation utilized by the destination eNB.

26. The method of claim 21, further comprising indicating a result of the adjusting to one or more served user equipment units (UEs).

27. The method of claim 21, wherein the adjusting comprises adjusting one or more subframes in the allocation of access subframes and backhaul subframes such that respective non-Multimedia Broadcast over Single-Frequency Network (MBSFN) subframes are allocated as access subframes.

28. A relay node, comprising:
a memory that stores data relating to a source Evolved Node B (eNB) and a destination eNB; and
a processor configured to identify an allocation of access subframes and backhaul subframes associated with relay communication, to initialize a handover of the relay node from the source eNB to the destination eNB, to obtain information relating to an access/backhaul subframe allocation utilized by the destination eNB, and to adjust one or more subframes in the allocation of access subframes and backhaul subframes, based on the access/backhaul subframe allocation utilized by the destination eNB, such that a random access response (RAR) transmitted by the destination eNB occurs on a downlink backhaul subframe.

29. The relay node of claim 28, wherein the processor is further configured to adjust one or more subframes in the allocation of access subframes and backhaul subframes in response to a random access channel (RACH) allocation utilized by the destination eNB.

30. The relay node of claim 29, wherein the processor is further configured to adjust one or more subframes in the allocation of access subframes and backhaul subframes such that a RACH occasion assigned by the destination eNB occurs on an uplink backhaul subframe with the destination eNB.

31. The relay node of claim 28, wherein the processor is further configured to adjust one or more subframes in the allocation of access subframes and backhaul subframes such that respective non-Multimedia Broadcast over Single-Frequency Network (MBSFN) subframes are allocated as access subframes.

32. A relay node, comprising:
means for identifying an allocation of access resources and backhaul resources associated with relay communication;
means for initializing a relay handover of the relay node from a source cell to a target cell; and
means for adjusting at least a portion of the allocation of access resources and backhaul resources, based on an access/backhaul resource partitioning associated with the target cell, such that a random access response (RAR) transmitted by the target cell occurs on a downlink backhaul subframe.

33. The relay node of claim 32, wherein the means for adjusting comprises means for adjusting at least a portion of the allocation of access resources and backhaul resources such that a random access channel (RACH) occasion assigned by the target cell occurs on an uplink backhaul subframe with the target cell.

34. The relay node of claim 32, wherein the means for adjusting comprises means for adjusting at least a portion of the allocation of access resources and backhaul resources such that respective non-Multimedia Broadcast over Single-Frequency Network (MBSFN) subframes are allocated as access subframes.

35. A computer program product, comprising:
a non-transitory computer-readable medium, comprising:
code for causing a computer to identify an allocation of access resources and backhaul resources associated with relay communication;
code for causing a computer to initialize a relay handover of a relay node from a source cell to a target cell; and
code for causing a computer to adjust at least a portion of the allocation of access resources and backhaul resources, based on an access/backhaul resource partitioning associated with the target cell, such that a random access response (RAR) transmitted by the target cell occurs on a downlink backhaul subframe.

* * * * *